(12) United States Patent  
Davis et al.

(10) Patent No.: US 9,870,562 B2  
(45) Date of Patent: Jan. 16, 2018

(54) METHOD AND SYSTEM FOR INTEGRATION OF MARKET EXCHANGE AND ISSUER PROCESSING FOR BLOCKCHAIN-BASED TRANSACTIONS

(71) Applicant: MasterCard International Incorporated, Purchase, NY (US)

(72) Inventors: Steven Charles Davis, Saint Peters, MO (US); Ashish Raghavendra Tetali, Dardenne Prarie, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 301 days.

(21) Appl. No.: 14/719,010

(22) Filed: May 21, 2015

(65) Prior Publication Data

US 2016/0342978 A1 Nov. 24, 2016

(51) Int. Cl.
*G06Q 20/40* (2012.01)
*G06Q 10/00* (2012.01)
(Continued)

(52) U.S. Cl.
CPC .............. *G06Q 20/40* (2013.01); *G06Q 10/00* (2013.01); *G06Q 20/02* (2013.01);
(Continued)

(58) Field of Classification Search
CPC ..................................................... G06Q 20/40
(Continued)

(56) References Cited

U.S. PATENT DOCUMENTS

2014/0201057 A1 7/2014 Shuster
2014/0258121 A1* 9/2014 Raman ................ G06Q 20/383
705/44

(Continued)

FOREIGN PATENT DOCUMENTS

GB 2514716 A 12/2014

OTHER PUBLICATIONS

Notification of Transmittal of the International Search Report (Forms PCT/ISA/220 and PCT/ISA/210) and the Written Opinion of the International Searching Authority (Form PCT/ISA/237) dated Jul. 7, 2016, by the International Searching Authority in corresponding International Application No. PCT/US2016/031236. (16 pages).

(Continued)

*Primary Examiner* — Robert R Niquette
(74) *Attorney, Agent, or Firm* — Buchanan Ingersoll & Rooney PC

(57) ABSTRACT

A method for authorization of a blockchain transaction includes: storing account profiles, each profile including an account identifier, fiat amount, and blockchain amount; receiving a transaction message, the transaction message being formatted based on transaction message standards and including a first data element that includes a specific account identifier and a second data element reserved for private use that includes a network identifier and transaction amount; identifying a specific account profile that includes the specific account identifier; identifying a risk value based on the transaction amount and at least one of: the fiat amount and blockchain amount; determining authorization of a transaction based on the identified risk value; modifying the transaction message based on the authorization determination; and transmitting the modified transaction message.

20 Claims, 14 Drawing Sheets

400

(51) Int. Cl.
  *G06Q 20/22* (2012.01)
  *G06Q 20/38* (2012.01)
  *G06Q 20/02* (2012.01)
  *G06Q 20/06* (2012.01)
  *G06Q 20/08* (2012.01)
  *G06Q 20/36* (2012.01)

(52) U.S. Cl.
  CPC ..... *G06Q 20/0655* (2013.01); *G06Q 20/0855* (2013.01); *G06Q 20/227* (2013.01); *G06Q 20/3674* (2013.01); *G06Q 20/3676* (2013.01); *G06Q 20/3678* (2013.01); *G06Q 20/382* (2013.01); *G06Q 20/3827* (2013.01); *G06Q 20/38215* (2013.01); *G06Q 20/4016* (2013.01)

(58) Field of Classification Search
  USPC .......................................................... 705/44
  See application file for complete search history.

(56) References Cited

U.S. PATENT DOCUMENTS

| | | | | |
|---|---|---|---|---|
| 2015/0046337 A1* | 2/2015 | Hu | ..................... | G06Q 20/0658 705/65 |
| 2015/0154597 A1* | 6/2015 | Bacastow | .......... | G06Q 20/4012 705/72 |
| 2015/0161587 A1* | 6/2015 | Khan | ................. | G06Q 20/3223 705/44 |
| 2015/0220928 A1* | 8/2015 | Allen | ................. | G06Q 20/0655 705/67 |
| 2015/0262176 A1* | 9/2015 | Langschaedel | ...... | G06Q 20/065 705/71 |
| 2016/0071110 A1* | 3/2016 | Lazay | .............. | G06Q 20/40145 705/44 |
| 2016/0098712 A1* | 4/2016 | Karaki | ................. | G06Q 20/425 705/44 |
| 2016/0210626 A1* | 7/2016 | Ortiz | .................... | G06Q 20/023 |

OTHER PUBLICATIONS

Milton, "Bitcoins, Banking and the Blockchain", Digital, (Apr. 24, 2015), XP055283987, Retrieved from the Internet: URL:http://www.actuaries.digital/2015/04/24/bitcoins-banking-and-the-blockchain/. (6 pages).

Anonymous, "Peer-to-peer", Wikipedia, the free encyclopedia, (Apr. 28, 2014), XP055204670, Retrieved from the Internet: URL:https://en.wi kipedia.org/w/index.php?t itle=Peer-to-peer &oldid=606144519. (14 pages).

Anonymous, "Bitcoin network", Wikipedia, the free encyclopedia, (May 19, 2015), XP055283973, Retrieved from the Internet: URL:https://en.wikipedia.org/w/index.php?title=Bi tcoin_network &oldid=663150419. (9 pages).

Biryukov et al., "Deanonymisation of Clients in Bitcoin P2P Network", Computer and Communications Security, ACM, 2 Penn Plaza, Suite 701 New York NY 10121-0701 USA, (Nov. 3, 2014), XP058060729, pp. 15-29.

Anonymous, "Blockchain", (database), Wikipedla, the free encyclopedia, (May 20, 2015), XP055283975, Retrieved from the Internet: URL:https://en.wikipedia.Org/w/index. php7title=Blockchain_{database)&oldid-663285695. (2 pages).

Anonymous, "How do bitcoin transactions work?", CoinDesk, (Mar. 20, 2015), XP055283978, Retrieved from the Internet: URL:http://www.coIndesk.com/i nformati on/ho w-do-bitcoin-transactions-work/. (3 pages).

* cited by examiner

METHOD AND SYSTEM FOR INTEGRATION OF MARKET EXCHANGE AND ISSUER PROCESSING FOR BLOCKCHAIN-BASED TRANSACTIONS

FIELD

The present disclosure relates to the authorizing of blockchain transactions, specifically the identification of risk values for a blockchain transaction based on an account's available fiat and blockchain currency and use thereof in determining authorization of a payment transaction using blockchain currency.

BACKGROUND

In recent times, blockchain currencies have seen increased usage over traditional fiat currencies by consumers who value anonymity and security. Currencies that use a blockchain, such as cryptographic currencies ("cryptocurrencies"), offer consumers a currency that is decentralized and relatively anonymous and secure in its use. For example, a transaction that is posted to a blockchain may not require any information regarding the sender or recipient of the currency, and thus may enable the payer and payee of a transaction to retain anonymity. Such an aspect of blockchain transactions may be highly desirable for consumers that wish to maintain their privacy, and may help reduce the likelihood of fraud due to theft of their information.

However, while blockchain currencies can often provide such safety and security for the payer's information, such security may be limited for payees, particularly due to the limitations of the blockchain. For example, it often takes a significant amount of time, around ten minutes, for a blockchain-based transaction to be processed, due to the computer processing time and resources required to verify and update the blockchain. Conversely, traditional fiat payment transactions that are processed using payment networks often have processing times that are measured in nanoseconds. As a result, consumers and merchants that are accustomed to fast transaction times are often either forced to wait a significant amount of time for a blockchain transaction to be conducted, or the payee must rely on the payer's good faith that their transfer will be valid. In such latter instances, the anonymity of the blockchain may leave the payee at a disadvantage, because the inability for the payee to identify the payer may prohibit the payee from utilizing various risk or fraud detection methods. Therefore, many entities, particularly merchants, retailers, service providers, and other purveyors of goods and services, may be wary of accepting blockchain currency for products and participating in blockchain transactions.

In addition, the consumers themselves may often be reluctant to using blockchain currencies. Because blockchain currencies are decentralized and rely on the blockchain to keep track of what accounts have access to what amount of currency, it can be difficult for consumers to adopt, or even understand, blockchain currencies, particularly in relation to well-known and understood traditional fiat currencies and accounts. This may be particularly troublesome for consumers that are accustomed to having financial institutions hold their currency in an account. The nature of blockchain currencies is that the access to any given address to which currency is associated is controlled based on possession of electronic credentials, often referred to as an electronic wallet, e-wallet, or simply "wallet." As such, if the wallet is lost, discarded, or stolen, the associated currency often cannot be recovered by the rightful owner and may be used without their knowledge and permission. Furthermore, because of the anonymous nature of the blockchain, the consumer may be unable to prove their identity and ownership of a wallet, and thereby have little recourse if their wallet and/or associated currency is stolen.

Thus, there is a need to improve on the storage and processing of transactions that utilize blockchain currencies. Existing payment networks and payment processing systems that utilize fiat currency are specially designed and configured to safely store and protect consumer and merchant information and credentials and to transmit sensitive data between computing systems. In addition, existing payment systems are often configured to perform complex calculations, risk assessments, and fraud algorithm applications extremely fast, as to ensure quick processing of fiat currency transactions. Accordingly, the use of traditional payment networks and payment systems technologies in combination with blockchain currencies may provide consumers and merchants the benefits of the decentralized blockchain while still maintaining security of account information and provide a strong defense against fraud and theft.

SUMMARY

The present disclosure provides a description of systems and methods for authorization of a blockchain transaction.

A method for authorization of a blockchain transaction includes: storing, in an account database, a plurality of account profiles, wherein each account profile includes data related to a consumer including at least an account identifier, a fiat currency amount, and one or more blockchain currency amounts, each blockchain currency amount being associated with a blockchain network; receiving, by a receiving device, a transaction message for a payment transaction, wherein the transaction message is formatted based on one or more standards and includes a plurality of data elements, including a first data element configured to store a personal account number that includes a specific account identifier and a second data element reserved for private use that includes at least a network identifier and a transaction amount; identifying, by a processing device, a specific account profile stored in the account database where the included account identifier corresponds to the specific account identifier included in the first data element of the received transaction message; identifying, by the processing device, a risk value for the payment transaction, wherein the risk value is based on at least the transaction amount included in the second data element of the received transaction message and at least one of: the fiat currency amount and a blockchain currency amount associated with a blockchain network corresponding to the network identifier included in the second data element of the received transaction message included in the identified specific account profile; determining, by the processing device, authorization of the payment transaction based on at least the identified risk value; modifying, by the processing device, the received transaction message based on the authorization determination; and transmitting, by a transmitting device, the modified transaction message.

A system for authorization of a blockchain transaction includes an account database, a receiving device, a processing device, and a transmitting device. The account database is configured to store a plurality of account profiles, wherein each account profile includes data related to a consumer including at least an account identifier, a fiat currency amount, and one or more blockchain currency amounts, each blockchain currency amount being associated with a blockchain network. The receiving device is configured to receive a transaction message for a payment transaction, wherein the transaction message is formatted based on one or more standards and includes a plurality of data elements, including a first data element configured to store a personal account number that includes a specific account identifier and a second data element reserved for private use that includes at least a network identifier and a transaction amount. The processing device is configured to: identify a specific account profile stored in the account database where the included account identifier corresponds to the specific account identifier included in the first data element of the received transaction message; identify a risk value for the payment transaction, wherein the risk value is based on at least the transaction amount included in the second data element of the received transaction message and at least one of: the fiat currency amount and a blockchain currency amount associated with a blockchain network corresponding to the network identifier included in the second data element of the received transaction message included in the identified specific account profile; determine authorization of the payment transaction based on at least the identified risk value; and modify the received transaction message based on the authorization determination. The transmitting device is configured to transmit the modified transaction message.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, additional information may be captured, such as a source address, timestamp, etc.

System for Use of Blockchain Currency in a Payment Network

Figure 1:
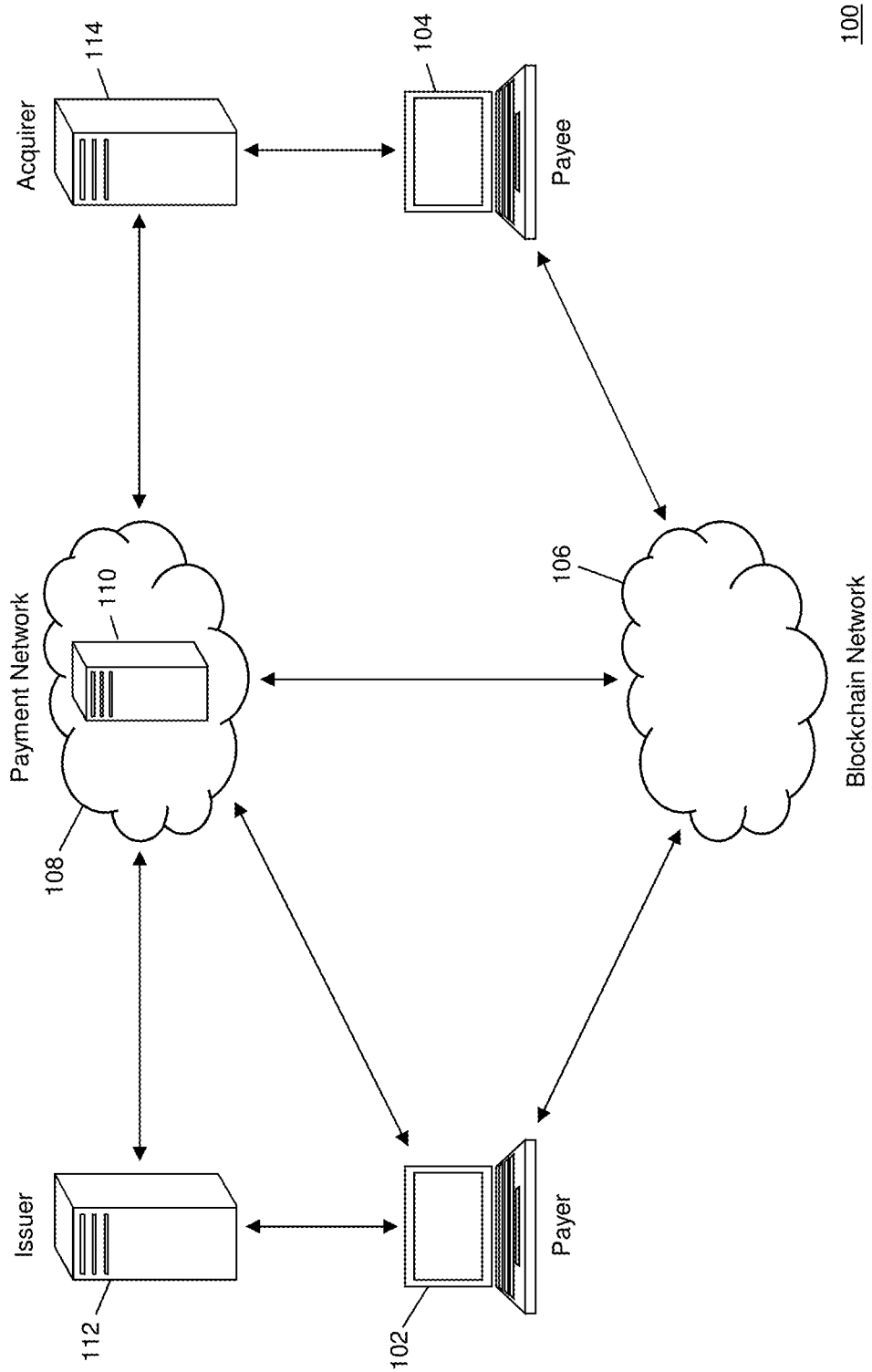
FIG. 1 is a block diagram illustrating a high level system architecture for managing blockchain currency storage and linkage thereof to privately verified identifies and use thereof in the processing of blockchain transactions using payment networks in accordance with exemplary embodiments.

FIG. 1 illustrates a system 100 for the managing of blockchain and fiat currency and use thereof in payment transactions using a traditional payment network, including the linkage of verified identifies to blockchain-based transactions and assessing of risk in blockchain-based transactions.

In the system 100, a blockchain transaction may occur between the computing device of a payer 102 and the computing device of a payee 104. As used herein, "payer" may refer to a computing device and/or a consumer that is funding a payment transaction, and "payee" may refer to a computing device and/or a consumer that is receiving payment in a payment transaction. The blockchain transaction may be processed by one or more computing devices that comprise a blockchain network 106. The blockchain network may receive at least a destination address (e.g., associated with the payer 104) and an amount of blockchain currency and may process the transaction by generating a block that is added to a blockchain that includes a record for the transaction.

The computing device of the payer 102 may digitally sign the transaction request using an encryption key stored in the computing device, such as stored in an electronic wallet. The digital signature may be, include, or otherwise be associated with an address that is generated using the encryption key, which may be associated with blockchain currency in the blockchain, and may be used to transfer blockchain currency to an address associated with the payee 104 and/or their computing device. In some embodiments, the address may be encoded using one or more hashing and/or encoding algorithms, such as the Base58Check encoding algorithm. The generation and use of addresses for the transfer of blockchain currency in blockchain-based transactions using the blockchain network 106 will be apparent to persons having skill in the relevant art.

The system 100 may also include a payment network 108. The payment network 108 may be configured to process payment transactions using methods and systems that will be apparent to persons having skill in the relevant art. In the system 100, the payment network 108 may also include a processing server 110. The processing server 110, discussed in more detail below, may be configured to authorize blockchain-based transactions using the payment network 108 and traditional payment rails, may be configured to link blockchain transactions with privately verified identities including fiat and/or blockchain transaction accounts, and may be configured to provide risk and sanction assessments for blockchain transactions.

The payer 102 may be associated with an issuer 112. The issuer 112, discussed in more detail below, may be a computing system of a financial institution, such as an issuing bank, that issues one or more transaction accounts to the payer 102. The transaction accounts may include one or more fiat currency transaction accounts, one or more blockchain currency transaction accounts, one or more combined currency transaction accounts, or any combination thereof. For example, the payer 102 may have a transaction account with the issuer 112 for both fiat and blockchain currency, and an additional fiat currency transaction account.

The payee 104 may be associated with an acquirer 114. The acquirer 114 may be a computing system of a financial institution, such as an acquiring bank, that issues one or more transaction accounts to the payee 104. The acquirer 114 may be the equivalent of the issuer 112, but with respect to the payee 104 rather than the payer 102. In some instances, the issuer 112 and the acquirer 114 may be the same financial institution. For example, the issuer 112 may provide transaction accounts to both the payer 102 and the payee 104.

The payer 102 may conduct a blockchain transaction with the payee 104. As part of the blockchain transaction, the payee 104 may generate a destination address for receipt of payment of blockchain currency. The destination address may be generated using an encryption key stored in the computing device of the payee 104. The encryption key may be part of a key pair, such as a public key corresponding to a private key stored in the computing device. In some instances, the payee 104 may provide the public key to the payer 102, and the payer 102 may generate the destination address. A transaction request may then be submitted by the payer 102 for payment of an agreed-upon blockchain currency amount to the destination address provided by the payee 104. In a traditional blockchain transaction, the transaction request may be submitted by the computing device to the blockchain network 106. In the present system 100, the transaction request may be submitted to the processing server 110 of the payment network 108.

The transaction request may be a transaction message and may be formatted based on one or more standards for the governance thereof, such as the International Organization for Standardization's ISO 8583 standard. In some instances, the processing server 110 may receive the transaction request and may generate a subsequent transaction message. The transaction message may include a plurality of data elements, which may be associated with specific usage based on the one or more standards. For example, the data elements may include a data element for the storage of transaction amount and also include at least one data element reserved for private use. In the system 100, the transaction message submitted to the processing server 110 may include a data element reserved for private use that includes data associated with the desired blockchain transaction.

For instance, the data element reserved for private use may include a network identifier, a transaction amount, and at least one of: a public key and an address identifier. The network identifier may be associated with a blockchain network 106 associated with the blockchain currency being transferred in the transaction. The network identifier may be used by the processing server 110 to identify the associated blockchain network 106 for posting of the eventual blockchain transaction. In addition, by using different identifiers, the processing server 110 may be configured to perform the functions discussed herein for a plurality of different blockchain currencies and associated blockchain networks 106.

The transaction amount may be an amount of blockchain currency being transferred as a result of the transaction. The address identifier may be the destination address for the blockchain currency, as provided by the payee 104 or generated by the payer 102 using information provided by the payee 104 (e.g., their public key). In instances where the data element includes a public key (e.g., associated with the payee 104) instead of an address identifier, the processing server 110 may be configured to generate an address identifier using the public key. In some instances, the address identifier may be encoded using one or more hashing and/or encoding algorithms, such as the Base58Check algorithm.

In some embodiments, the transaction message may include information for multiple payees 104. In such an embodiment, the data element reserved for private use may include multiple transaction amounts and associated address identifiers and/or public keys. In another embodiment, the transaction message may include multiple data elements reserved for private use, with each one including a transaction amount and a different address identifier and/or public key associated with a payee 104. In some instances, one of the payees 104 may be the payer 102. For example, the blockchain transaction may include a remainder amount of blockchain currency to be retained by the payer 102, and may thereby include a transfer from an input address to a destination address of the payer 102, as will be apparent to persons having skill in the relevant art.

In some embodiments, the data element reserved for private use, or an alternative data element reserved for private use in the transaction message, may include input information associated with the payer 102. The input information may include a transaction identifier associated with a prior blockchain transaction as well as a public key associated with the payer 102 and a digital signature. The digital signature may be generated using a private key corresponding to the public key and may be used for verification of ownership of a blockchain currency amount associated with the transaction identifier by the payer 102, such that the payer 102 is authorized to transfer the blockchain currency in the requested transaction.

In some instances, the transaction message may be submitted to the processing server 110 by the payer 102. In other instances, the payer 102 may provide the transaction information to the issuer 112, which may generate and submit the transaction message to the processing server 110. Once the transaction message is received by the processing server 110, the processing server 110 may perform additional functions, such as an assessment of risk or sanctions as discussed in more detail below. A corresponding blockchain transaction may then be processed using the blockchain network 106 based on the information included in the data element(s) reserved for private use. In some embodiments, the blockchain transaction may be initiated by the processing server 110. In other embodiments, the processing server 110 may provide the transaction message or data included therein to the issuer 112, which may initiate the blockchain transaction, such as after evaluating risk for the transaction, assessing if the payer 102 has sufficient blockchain currency for the transaction, and etc., as discussed below.

For instance, as discussed in more detail below, the issuer 112 may manage fractional reserves of fiat and blockchain currency, which may include the storage of currencies associated with the payer 102. The issuer 112 may store a transaction account of blockchain currency associated with the payer 102 such that, when a transaction is attempted by the payer 102, the issuer 112 may verify the available funds of the payer 102 prior to initiating the blockchain transaction, which may be before submitting the transaction message to the processing server 110 and/or before submitting a transaction request to the blockchain network 106.

In another example, the issuer 112 may assess a risk for the transaction based on an evaluation provided by the processing server 110 or performed by the issuer 112, such as based on the payer's available funds, credit history, or other fraud, sanction, and/or risk considerations that will be apparent to persons having skill in the relevant art. In some embodiments, the acquirer 114 may assess a risk for the transaction prior to processing by the blockchain network 106. For instance, the acquirer 114 may evaluate the reliability of the payer 102, an expectation of fraud, etc. based on data provided by the issuer 112, processing server 110, or third party entity, as discussed in more detail below. In some instances, the payer 102 may decline the use of chargeback or payment protection in exchange for a discount offered by the payee 104 (e.g., a merchant), which may be beneficial for the merchant 104 as a result of reduced fees. In other instances, the payee 104 may decline the use of risk assessments and other protections for a transaction.

In some embodiments, the issuer 112 and/or processing server 110 may be further configured to store private keys on behalf of payers 102 and/or payees 104. In such embodiments, the private key may be stored such that the issuer 112 and/or processing server 110 may initiate and digitally sign blockchain transactions on behalf of a payer 102 such that the payer 102 does not need to retain possession of a computing device for use in blockchain transactions. For example, the issuer 112 may store the private key on behalf of the payer 102 and any transaction identifiers associated with the payer 102 (e.g., in their blockchain currency account) and may be configured to generate the digital signature and include the generated signature and transaction identifier in transaction messages for blockchain transactions involving the payer 102.

In some embodiments, the processing server 110 may be further configured to link blockchain transactions with privately verified identities, such as with the payer 102, payee 104, or transaction accounts associated thereof. For example, the processing server 110 may store account information for transaction accounts associated with the payer 102 (e.g., held by the issuer 112) and the payee 104 (e.g., held by the acquirer 114), which may include address identifiers. The processing server 110 may then associate blockchain transactions with the stored account information using the account identifiers included therein and account identifiers included in data elements in received transaction messages. The processing server 110 may thereby store historical transaction data for individuals for blockchain transactions. In instances where an individual may have a combined fiat and blockchain currency account, the processing server 110 may, as a result, store transaction history for a consumer's fiat and blockchain transactions.

The methods and systems discussed herein accordingly provide for the processing of blockchain transactions using transaction messaging and traditional payment networks, which may be provide significant benefits to consumers and financial institutions that are currently unavailable in blockchain transactions. By using traditional payment rails and transaction messages, which are highly regulated and secure, transaction information may be transmitted at a higher level of security than methods currently used in blockchain transactions. In addition, the storage of private keys in financial institutions and/or payment networks may enable consumers to engage in blockchain transactions without being in constant possession of a computing device that stores their private keys. This may reduce the risk of theft of the consumer's blockchain currency by trusting the data to financial institutions and payment networks that already specialize in the storage of sensitive financial information, and that are well equipped to transmit and analyze transaction messages.

In addition, by processing blockchain transactions using payment networks, payment networks may be able to evaluate the likelihood of fraud and assess risk for blockchain transactions using existing fraud and risk algorithms and information that is available to payment networks, such as historical fiat and blockchain transaction data, credit bureau data, demographic information, etc., that is unavailable for use in blockchain networks 106. As a result, payers 102 and payees 104 may engage in blockchain transactions with added safeguards against fraud and risk. In addition, the evaluation of risk may be used by a financial institution to provide the consumer with funds or an indication of thereof to a payee (e.g., a merchant supplying a product to the payer) without waiting for the significantly long processing time of traditional blockchain transactions.

For example, a consumer may want to use a blockchain currency to pay for a product at a merchant. In a traditional blockchain transaction, the merchant must wait at least ten minutes for the transaction to be verified (e.g., and the merchant assured of the consumer's ability to pay) or risk providing the product and not receiving payment. By using the methods and systems discussed herein, the merchant's acquirer may be able to evaluate the risk of the transaction to determine if the product should be provided prior to waiting for verification of the blockchain transaction. In addition, if a financial institution stores the blockchain currency for the consumer, the financial institution, a trusted and verified entity, can ensure to the acquirer that the consumer has sufficient funds, so that the merchant can provide the product to the consumer immediately. Furthermore, if the financial institution manages fractional reserves for the blockchain currency, the financial institution can immediately update the consumer's available currency accordingly, such that the consumer can engage in a series of transactions without waiting for blockchain network verification.

Therefore, the methods and systems discussed herein can provide for significant improvement over the traditional processing of blockchain transactions via the use of fractional reserves, transaction messages, risk evaluation, and payment network processing, by increasing consumer security, significantly decreasing processing time, and providing significantly increased defense against fraud.

Processing Server

Figure 2:
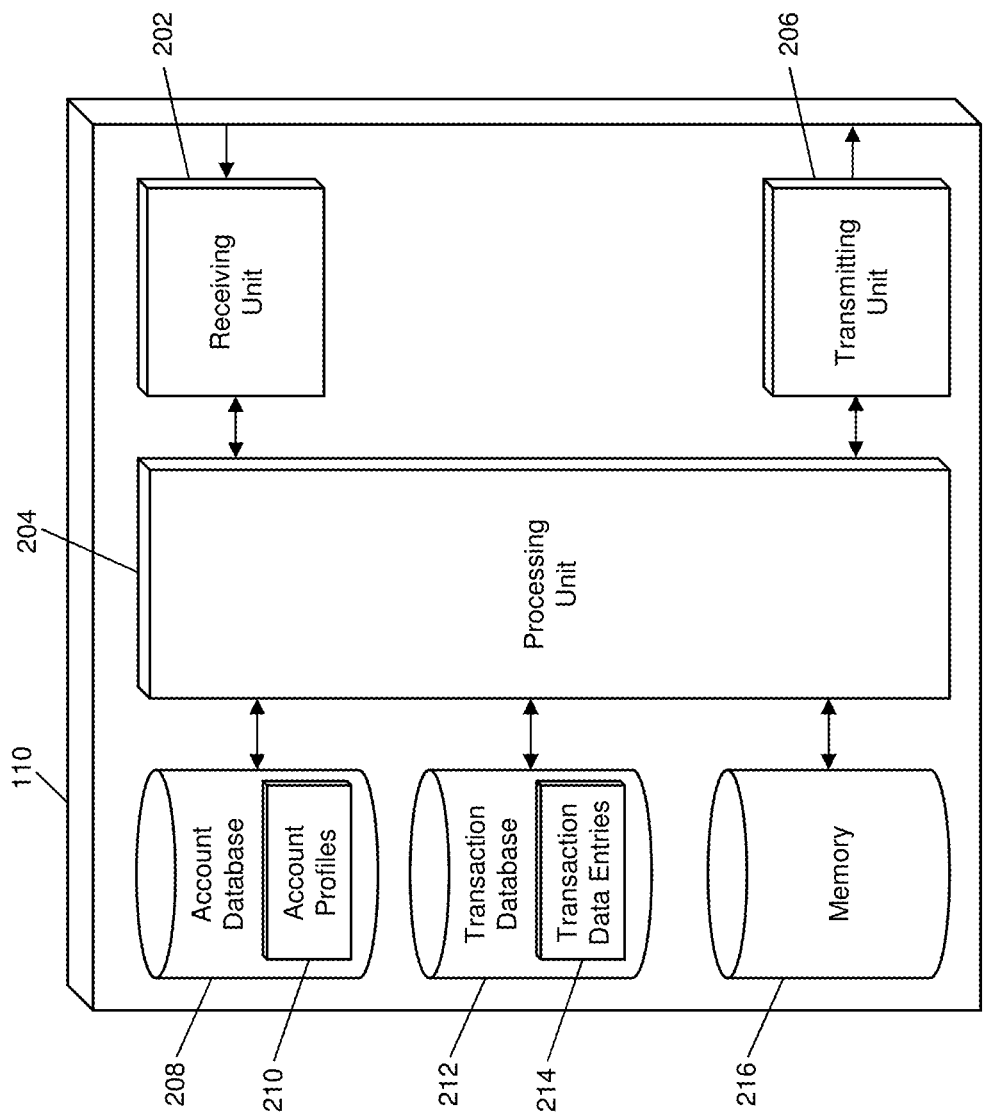
FIG. 2 is a block diagram illustrating the processing server of FIG. 1 for authorizing blockchain transactions and linking blockchain transactions to privately verified identifies in accordance with exemplary embodiments.

FIG. 2 illustrates an embodiment of the processing server 110 of the system 100. It will be apparent to persons having skill in the relevant art that the embodiment of the processing server 110 illustrated in FIG. 2 is provided as illustration only and may not be exhaustive to all possible configurations of the processing server 110 suitable for performing the functions as discussed herein. For example, the computer system 1400 illustrated in FIG. 14 and discussed in more detail below may be a suitable configuration of the processing server 110.

The processing server 110 may include a receiving unit 202. The receiving unit 202 may be configured to receive data over one or more networks via one or more network protocols. The receiving unit 202 may be configured to receive transaction messages from issuers 112, acquirers 114, payers 102, and other entities that are formatted pursuant to one or more standards for the interchange of transaction messages, such as the ISO 8583 standard, and using communication protocols associated thereby. The receiving unit 202 may also receive transaction requests from issuers 112, acquirers 114, and/or payers 102. The receiving unit 202 may also be configured to receive account information for transaction accounts, which may include fiat currency and blockchain currency accounts, from financial institutions, such as the issuer 112 and the acquirer 114. The receiving unit 202 may be further configured to receive any additional data suitable for performing the functions disclosed herein, such as data that may be used in the risk assessment of a blockchain transaction, such as credit bureau information, demographic characteristics, etc.

The processing server 110 may also include a processing unit 204. The processing unit 204 may be configured to perform the functions of the processing server 110 discussed herein as will be apparent to persons having skill in the relevant art. When a transaction request for a blockchain transaction is received by the receiving unit 202, the processing unit 204 may be configured to identify data included in the transaction request and generate a transaction message based thereon. The transaction message may be generated for compliance with one or more standards, such as the ISO 8583 standard, and may include a plurality of data elements. The data elements may include a data element configured to store a transaction amount and a data element reserved for private use. The processing unit 204 may be configured to store a zero value in the data element configured to store a transaction amount, and may be configured to store at least a network identifier or encoded value based thereon, an address identifier, and a transaction amount in the data element reserved for private use.

In some embodiments, the processing unit 204 may be further configured to generate the address identifier. In such an embodiment, the processing unit 204 may use a public key included in the received transaction request to generate a destination address. The destination address may be the address identifier, or, in some instances, the destination address may be encoded using one or more hashing and/or encoding algorithms, such as Base58Check encoding, to generate the address identifier.

The processing server 110 may also include a transmitting unit 206. The transmitting unit 206 may be configured to transmit data over one or more networks via one or more network protocols. The transmitting unit 206 may transmit data requests to the issuer 112, acquirer 114, payer 102, or other entities. The transmitting unit 206 may also be configured to transmit generated transaction messages to financial institutions, such as the issuer 112 and the acquirer 114, using the payment network 106. In some embodiments, the transmitting unit 206 may also transmit blockchain transaction requests to blockchain networks 106 based on information received by the receiving unit 202 and generated by the processing unit 204 for use in blockchain transactions. For example, the transmitting unit 206 may transmit a transaction message to the issuer 112, which may approve the corresponding blockchain transaction as indicated in an approval received by the receiving unit 202. The transmitting unit 206 may then transmit the blockchain transaction to the blockchain network 106 using methods and systems that will be apparent to persons having skill in the relevant art.

In some embodiments, the processing server 110 may also include an account database 208. The account database 208 may be configured to store a plurality of account profiles 210. Each account profile 210 may include data related to a consumer (e.g., the payer 102, payee 104, etc.) or a transaction account associated thereof, including at least an account identifier, a fiat currency amount, and one or more blockchain currency amounts. Each blockchain currency amount may be associated with a blockchain network 106. The account identifier may be a unique value associated with the account profile 210 used for identification thereof, such as a transaction account number, wallet identifier, device identifier, username, e-mail address, phone number, etc. In some embodiments, the account identifier may be a private key. The account profile 210 may also include a plurality of associated address identifiers used in blockchain transactions associated with the related consumer and/or transaction account.

In such an embodiment, the receiving unit 202 may be further configured to receive a transaction message for a blockchain transaction. The transaction message may include a data element configured to store a personal account number that includes a specific account identifier and a data element reserved for private use that includes at least a network identifier and a transaction amount. The processing unit 204 may be configured to identify a specific account profile 210 stored in the account database 208 that includes the specific account identifier. The processing unit 204 may be further configured to identify a risk value for the blockchain transaction. The risk value may be based on the transaction amount included in the data element reserved for private use and data included in the identified specific account profile 210.

For example, the risk value may be based on a correspondence between the transaction amount and a blockchain currency amount of the specific account profile 210 that is associated with a blockchain network 106 corresponding to the network identifier included in the data element reserved for private use. In some instances, the risk value may also be based on a corresponding amount of fiat currency, such as based on one or more conversion rates associated with conversion of the fiat currency to/from the respective blockchain currency.

The processing unit 204 may be further configured to determine authorization of the blockchain transaction based on the identified risk value. For example, if the processing unit 204 identifies that the blockchain transaction has a high risk value (e.g., indicating a high likelihood of fraud, sanctions, inability to pay, etc.), the processing unit 204 may determine that the transaction should be denied. The processing unit 204 may modify the transaction message to include the determination, and the transmitting unit 206 may be configured to transmit the transaction message to the issuer 112 and/or acquirer 114. The financial institution may then proceed in the processing of the transaction accordingly based on the determination. As part of the processing, the receiving unit 202 may receive an authorization response from the financial institution, and the transmitting unit 206 may forward the response as a reply to the received transaction message, and may also (e.g., if the transaction is approved) initiate the blockchain transaction with the blockchain network 106.

In some embodiments, the processing unit 204 may be further configured to link blockchain transactions with account profiles 210 stored in the account database 208. In such an embodiment, transaction messages received by the receiving unit 202 for blockchain transactions may include at least a first data element configured to store a personal account number, a second data element configured to store a merchant identifier, and a third data element, which may be reserved for private use, configured to store at least blockchain network identifier. The processing unit 204 may identify a first account profile 210 where the included account identifier corresponds to the personal account number and a second account profile 210 where the included account identifier corresponds to the merchant identifier.

The receiving unit 202 may also receive a transaction notification indicative of a blockchain transaction processed using a blockchain network 106 associated with the blockchain network identifier included in the third data element of the received transaction message. The transaction notification may include at least a transaction identifier and an address identifier. The address identifier may be associated with the identified first account profile 210 or the identified second account profile 210. The processing unit 204 may then store a linkage between the transaction identifier and the account identifier included in the account profile 210 associated with the address identifier. In some instances, the linkage may be stored via storage of the transaction identifier in the corresponding account profile 210, which may thereby be used in future blockchain transactions involving the associated transaction account. In some instances, the transmitting unit 206 may transmit the transaction identifier to a financial institution associated with the linked account, such that the financial institution may store the transaction identifier for use in future blockchain transactions. In some cases, the processing unit 204 may store transaction data included in the transaction message in the first and/or second account profiles 210.

In some embodiments, the processing server 110 may further include a transaction database 212. The transaction database 212 may be configured to store a plurality of transaction data entries 214. Each transaction data entry 214 may include data related to a payment transaction, which may be a fiat currency transaction or a blockchain currency transaction. Each transaction data entry 214 may include a transaction message, transaction notification, and/or data included therein, such as transaction times and/or dates, transaction identifiers, source addresses, destination addresses, transaction amounts, merchant data, consumer data, product data, loyalty data, reward data, etc. In some instances, transaction data entries 214 may be stored in an account profile 210 related to a transaction account involved in the associated payment transaction.

The processing server 110 may also include a memory 216. The memory 216 may be configured to store data suitable for use by the processing server 110 in performing the functions disclosed herein. For example, the memory 216 may store one or more hashing algorithms for encoding address identifiers, one or more rules for the generation of address identifiers, blockchain network data, rules and/or algorithms for calculating risk values, fiat and blockchain currency conversion algorithms or data, etc. Additional data that may be stored in the memory 216 will be apparent to persons having skill in the relevant art.

Financial Institution

Figure 3:
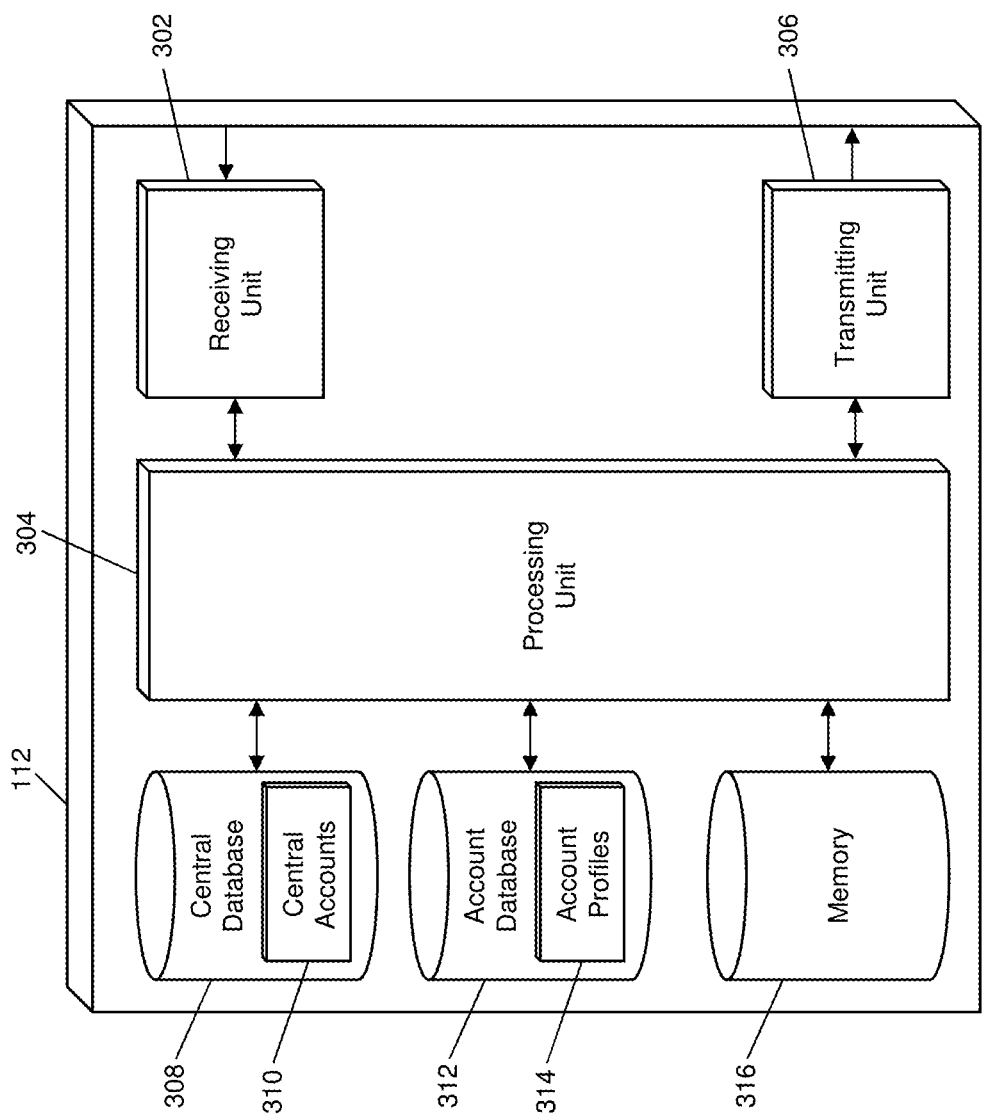
FIG. 3 is a block diagram illustrating the issuer of FIG. 1 for managing fractional reserves of fiat and blockchain currency in accordance with exemplary embodiments.

FIG. 3 illustrates an embodiment of a financial institution of the system 100, such as the issuer 112. It will be apparent to persons having skill in the relevant art that the embodiment of the issuer 112 illustrated in FIG. 3 is provided as illustration only and may not be exhaustive to all possible configurations of the issuer 112 suitable for performing the functions as discussed herein. For example, the computer system 1400 illustrated in FIG. 14 and discussed in more detail below may be a suitable configuration of the issuer 112.

The issuer 112 may include a central database 308. The central database 308 may be configured to store a plurality of central accounts 310. Each central account 310 may be associated with a type of currency and may include a corresponding currency amount. For instance, the issuer 112 may include at least a first central account 310 associated with a fiat currency and including a fiat currency amount and a second central account 310 associated with a blockchain currency and including a blockchain currency amount.

The issuer 112 may also include an account database 312. The account database 312 may be configured to store a plurality of account profiles 314. Each account profile 314 may be configured to store data related to a consumer (e.g., the payer 102) or a transaction account including at least a fiat currency amount, a blockchain currency amount, an account identifier, and one or more addresses. Each address may be associated with the account profile 314 and used as a destination address in the transfer of blockchain currency to the related consumer and/or transaction account.

The issuer 112 may further include a receiving unit 302. The receiving unit 302 may be configured to receive data over one or more networks via one or more network protocols. The receiving unit 302 may receive addresses from payers 102, payees 104, acquirers 114, processing servers 110, etc., which may be stored in respective account profiles 314. The receiving unit 302 may also be configured to receive transaction messages related to payment transactions. The transaction messages may be formatted pursuant to one or more standards, such as the ISO 8583 standard, and may be communicated to the issuer 112 using associated communication protocols and communication channels, such as the payment network 108 and/or associated payment rails. The transaction messages may include a plurality of data elements, including at least a data element reserved for private use that includes a specific address and a transaction amount.

The issuer 112 may also include a processing unit 304. The processing unit 304 may be configured to perform the functions of the issuer 112 discussed herein as will be apparent to persons having skill in the relevant art. The processing unit 304 may identify a specific account profile 314 stored in the account database that includes the address included in the received transaction message. The processing unit 304 may then update the blockchain currency amount included in the identified account profile 314 based on the transaction amount included in the data element reserved for private use in the received transaction message. The processing unit 304 may also update the blockchain currency amount in the central account 310 in the central database 308 associated with the blockchain currency.

In instances where a transaction account related to an account profile 314 that is stored in the account database 312 may be used to fund a blockchain transaction, the processing unit 304 may be configured to deduct the transaction amount from the blockchain currency amount in the identified account profile 314. The processing unit 304 may also update the blockchain currency amount included in the corresponding central account 310 stored in the central database 308. The processing unit 304 may be further configured to perform the same functions using fiat currencies or additional numbers and/or types of blockchain currencies.

In some embodiments, each account profile 314 may be further configured to store one or more encryption keys, such as a private and public key pair. In such an embodiment, the processing unit 304 may be configured to generate addresses using the public key stored in an account profile 314, for use as a destination address in a blockchain transaction. The processing unit 304 may also be configured to provide digital signatures for the transfer of blockchain currency from a specific account profile 314 using the private key included therein.

In some embodiments, the issuer 112 may be further configured to initiate blockchain transactions using the payment network 108. In such an embodiment, the receiving unit 302 may receive a transaction request from a payer 102. The transaction request may include at least a destination address (e.g., associated with the payee 104), a network identifier, a blockchain currency amount, and an account identifier. The processing unit 304 may identify an account profile 314 that includes the account identifier. In some instances, the processing unit 304 may verify that the account profile 314 includes a sufficient amount of blockchain currency to support the transaction prior to proceeding. The processing unit 304 may identify a transaction identifier, address, or other identifier for use in providing funding in the blockchain transaction, based on the data stored in the identified account profile 314. The processing unit 304 may also generate a digital signature using the private key stored therein. In some instances, the digital signature may be included in the received transaction request.

The processing unit 304 may then generate a transaction message. The transaction message may include a data element reserved for private use that may include the destination address, the network identifier, and the blockchain currency amount. The data element, or an alternate data element reserved for private use, may include the digital signature and transaction identifier or other identifier. In some instances, the transaction message may include a data element configured to store a transaction amount, which may include a zero amount, indicating that the transaction is not for fiat currency, and is instead a blockchain transaction. In some cases, a separate data element may indicate the transaction as a blockchain or non-fiat currency transaction.

The issuer 112 may include a transmitting unit 306 configured to transmit data over one or more networks via one or more network protocols. The transmitting unit 206 may submit the generated transaction message to the processing server 110 for processing the blockchain transaction using the methods and systems discussed herein. In some instances, the receiving unit 302 may receive a modified transaction message from the processing server 110. For example, the processing server 110 may perform a risk assessment and may modify the transaction message to include an identified risk value and/or an authorization determination based thereon. The processing unit 304 may then approve or deny the transaction based on the data included in the modified transaction message using methods or systems that will be apparent to persons having skill in the relevant art. The processing unit 304 may generate an authorization response, which may be submitted, by the transmitting unit 306, to the processing server 110 and processed accordingly. For instance, if the authorization response indicates approval, the processing server 110 may initiate the blockchain transaction at the blockchain network 106 and inform the payee 104 of the transaction approval.

The issuer 112 may also include a memory 316. The memory 316 may be configured to store data suitable for use by the issuer 112 in performing the functions disclosed herein. For example, the memory 316 may be configured to store rules or algorithms for authorizing transactions, for converting fiat currency to/from blockchain currency, for generating blockchain addresses, for generating digital signatures, etc. Additional data that may be stored in the issuer 112 will be apparent to persons having skill in the relevant art.

Process for Authorizing a Blockchain Transaction in a Payment Network

Figure 4:
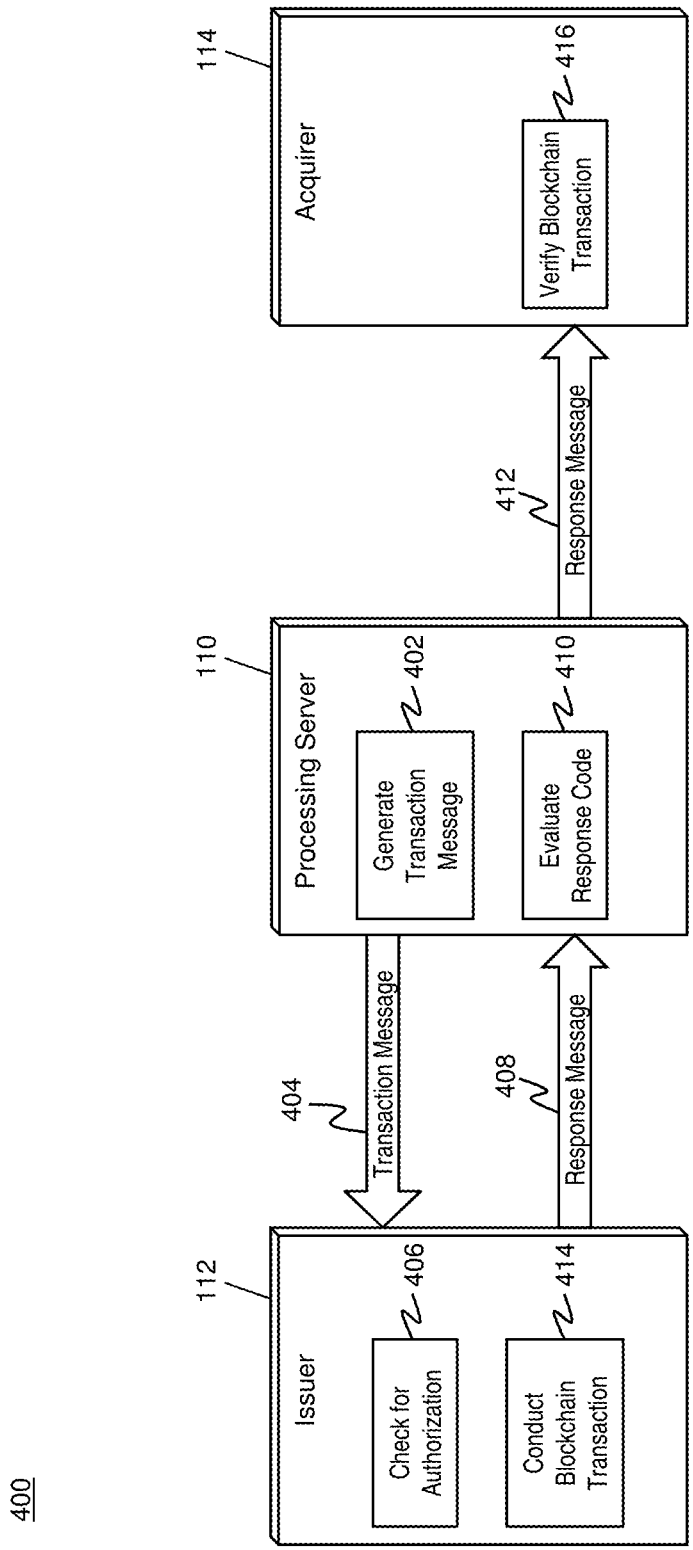
FIG. 4 is a flow diagram illustrating a process for authorizing a blockchain transaction using a transaction message and a payment network in accordance with exemplary embodiments.

FIG. 4 illustrates a process 400 for the authorization of a blockchain transaction in a traditional payment network using the system 100.

In step 402, the processing server 110 of the payment network 108 may generate a transaction message for a blockchain transaction. As discussed above, the transaction message may be formatted based on one or more standards and include a plurality of data elements, including at least a first data element configured to store a transaction amount and a second data element reserved for private use. The first data element may store a zero amount and the second data element may store a blockchain network identifier, a transaction amount of blockchain currency, and an address identifier associated with a payee 104.

In step 404, the transmitting unit 206 of the processing server 110 may transmit the transaction message to the issuer 112 via the payment network 108. The receiving unit 302 of the issuer 112 may receive the transaction message using associated protocols, and, in step 406, the processing unit 304 of the issuer 112 may check for authorization of the blockchain transaction. Authorization may be based on, for example, sufficient funding of the payer 102, such as based on a stored currency amount, based on a blockchain currency amount associated with a transaction identifier associated with the payer 102, etc., or other criteria that will be apparent to persons having skill in the relevant art. The processing unit 304 may generate an authorization response based on the determination, such as an authorization response that indicates approval or denial of the transaction.

In step 408, the transmitting unit 306 of the issuer may transmit the authorization response message to the processing server 110 via the payment network 108. The receiving unit 202 of the processing server 110 may receive the authorization response, which may be a transaction message formatted based on the one or more standards and transmitted using associated protocols, and, in step 410, the processing unit 204 of the processing server 110 may evaluate the response code. Evaluation of the response code may include, for example, checking for approval or denial, checking for a reference identifier (e.g., referring to a corresponding blockchain transaction, such as a transaction identifier), verifying transaction details, etc.

In step 412, the transmitting unit 206 of the processing server 110 may forward the response message on to the acquirer 114 via the payment network 108 and protocols associated with the transmission of transaction messages. In step 414, the issuer 112 may conduct the blockchain transaction, such as by submitting, using the transmitting unit 306, a transaction request to the appropriate blockchain network 106 using the details included in the data element reserved for private use in the received transaction message. In some instances, the issuer 112 may receive a transaction identifier from the blockchain network 106, and the processing unit 304 may include the transaction identifier in the authorization response message provided to the processing server 110, such as in a data element configured to store a reference identifier. In such instances, step 414 may be performed prior to steps 408 through 412. In step 416, the acquirer 114 may verify that the blockchain transaction has occurred, such as by verifying the receipt of blockchain currency, validating the transaction using the transaction identifier, etc.

Processing of a Blockchain-Based Transaction Message

Figure 5:
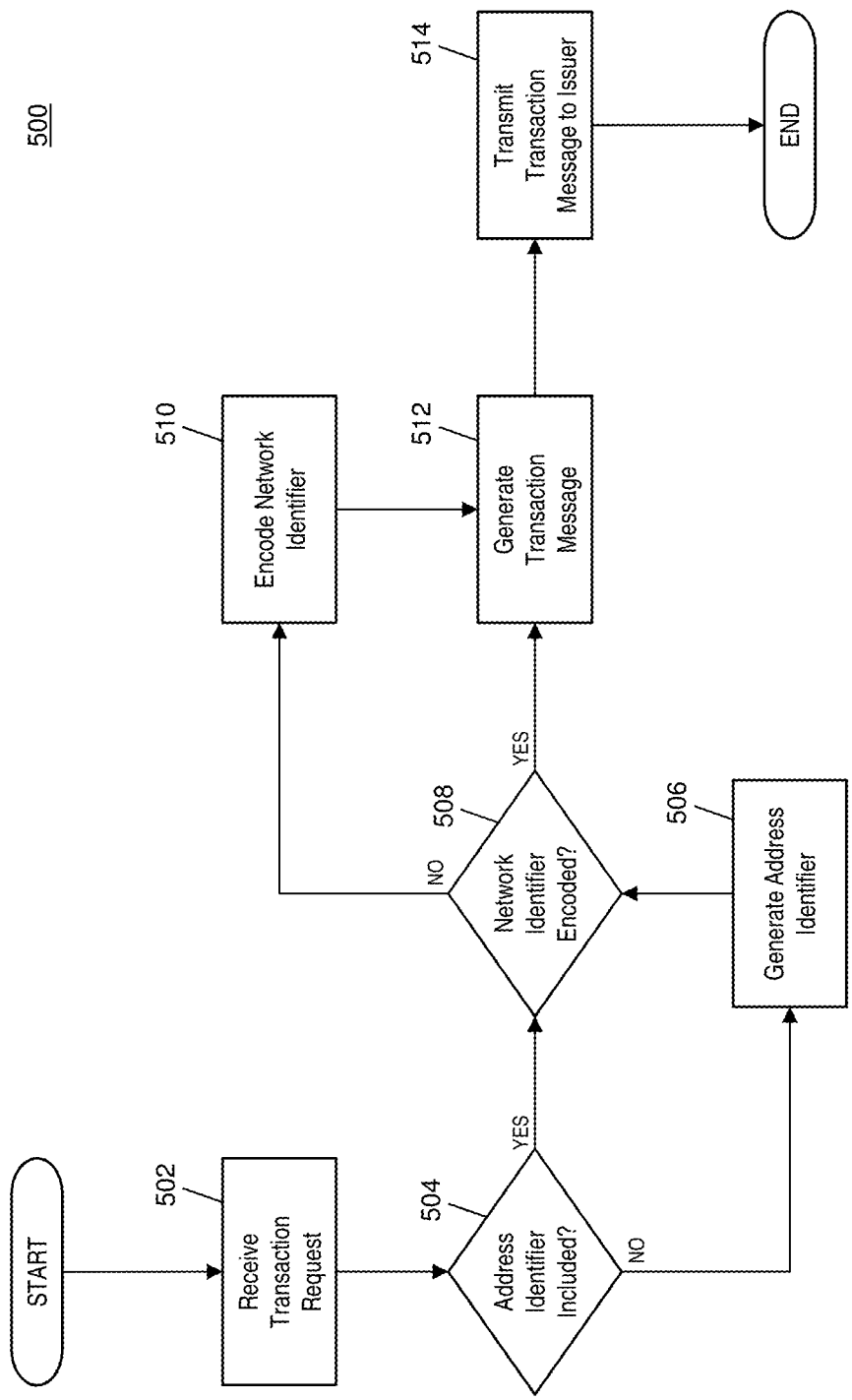
FIG. 5 is a flow diagram illustrating a process for the authorization of a blockchain transaction using the processing server of FIG. 2 in accordance with exemplary embodiments.

FIG. 5 illustrates the processing of a transaction message associated with a blockchain transaction in the processing server 110 of the payment network 108.

In step 502, the receiving unit 202 of the processing server 110 may receive a transaction request, such as from the payer 102 or an issuer 112. The transaction request may include at least a network identifier associated with a blockchain network 106, a transaction amount for a blockchain currency associated with the blockchain network 106, and a public key and/or an address identifier associated with a payee 104. In some embodiments, the transaction request may also include a transaction identifier and digital signature associated with a private key associated with the payer 102. In other embodiments, the transaction request may include an account identifier, such as in instances where the processing server 110 may store a private key associated with the payer 102, such as in an account profile 210 in the account database 208.

In step 504, the processing unit 204 of the processing server 110 may determine if the received transaction request includes an address identifier. If the transaction request does not include an address identifier, and, for instance, includes a public key associated with the payee 104, then, in step 506, the processing unit 204 may generate an address identifier for the payee 104. In some instances, step 506 may include transmitting, by the transmitting unit 206 of the processing server, the generated address identifier to the payee 104.

Once the address identifier has been generated and/or identified, then, in step 508, the processing unit 204 may determine if the network identifier included in the received transaction request is encoded. If the network identifier is not encoded, then, in step 510, the processing unit 204 may encode the network identifier. The network identifier may be encoded by applying the network identifier included in the received transaction request to one or more algorithms configured to generate an encoded value, such as a hexadecimal value.

Once the network identifier is encoded, in step 512, the processing unit 204 may generate a transaction message. The transaction message may be formatted based on one or more standards associated with transaction messages, such as the ISO 8583 standard. The transaction message may include a plurality of data elements. For instance, data elements may include a data element configured to store a transaction amount, which may include a zero amount or other value indicative of a blockchain transaction, a data element configured to store a personal account number, which may include an account identifier associated with the payer 102, a data element configured to store a merchant identifier, which may include an account identifier associated with the payee 104 (e.g., which may be the address identifier), and a data element reserved for private use. The data element reserved for private use may include at least the encoded network identifier, the address identifier, and the transaction amount of blockchain currency. In some embodiments, the data element reserved for private use, or an additional data element reserved for private use, may also include payer information, such as a transaction identifier and digital signature associated with the payer 102 to verify a source of the blockchain currency used to fund the transaction. In some instances, the transaction message may also include a message type indicator, which may be indicative of an authorization message.

In step 514, the transmitting unit 206 of the processing server 110 may transmit the transaction message to the issuer 112 associated with the payer 102 via the payment network 108. The issuer 112 may then authorize and conduct the blockchain transaction using the data included in the transaction message. In some embodiments, the process 500 may further include receiving, by the receiving unit 202, an authorization response from the issuer 112 and processing, by the processing unit 204, the transaction accordingly. For example, if the authorization response indicates approval of the transaction, the processing unit 204 of the processing server 110 may initiate a blockchain transaction with the blockchain network 106 using the associated transaction information.

Blockchain Transaction Invoice

Figure 6:
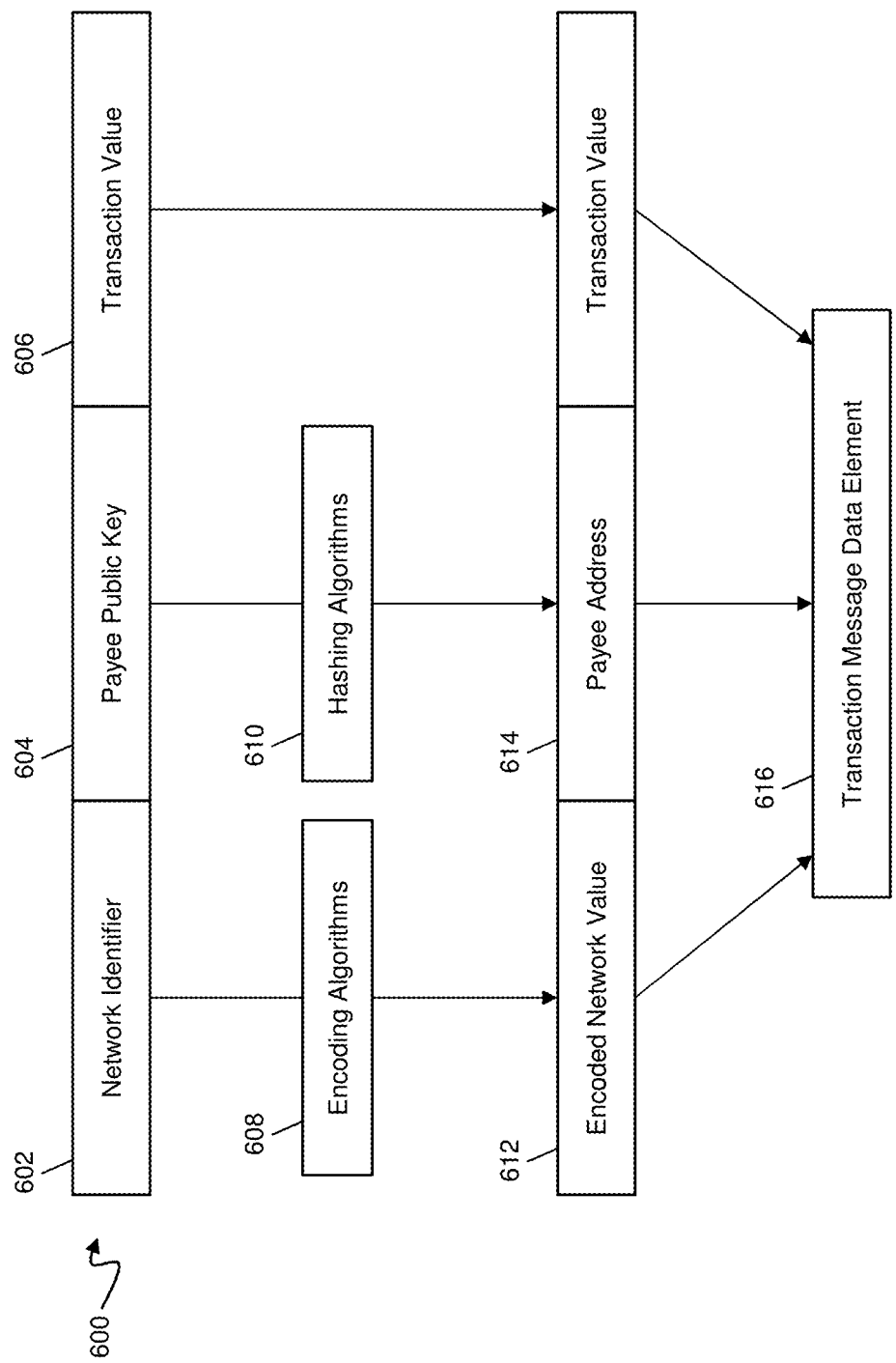
FIG. 6 is a diagram illustrating the generation of an invoice for inclusion in a reserve data element of a transaction message containing blockchain transaction details in accordance with exemplary embodiments.

FIG. 6 illustrates a process 600 for the generation of an invoice for a blockchain transaction. An invoice may be a data value, container, element, or other data storage type that may include data suitable for use in the initiation and processing of a blockchain transaction. The invoice, as discussed herein, may be stored in a data element of a transaction message, such as a data element reserved for private use based on one or more standards, such as the ISO 8583 standard.

As illustrated in FIG. 6, an invoice may be comprised of a network identifier 602, a payee public key 604, and a transaction value 606. The network identifier 602 may be associated with a blockchain network 106 used to process blockchain transactions of the respective blockchain currency. The network identifier 602 may be, for example, a unique value associated with the blockchain network 106, such as an alphanumeric name, a numerical value, an internet protocol address, a media access control address, etc. The payee public key 604 may be a public key of a key pair associated with a payee 104 to whom blockchain currency is to be transferred as a result of the blockchain transaction. The transaction value 606 may be a transaction amount of blockchain currency that is to be transferred as a result of the blockchain transaction.

The network identifier 602 may be encoded via the use of one or more encoding algorithms 608 to obtain an encoded network value 612. The encoded network value 612 may be a hexadecimal value associated with the blockchain network 106. The encoded network value 612 may be used, for instance, in the identification of the blockchain network 106 to be used to conduct the blockchain transaction. In some instances, the encoded network value 612 may be comprised of data used in the communication of a transaction request to the blockchain network 106, such as a destination address (e.g., an internet protocol address), or information usable by a processing device (e.g., of the processing server 110 or issuer 112) in the identification of a destination address for the blockchain network 106, such as by using a lookup table.

The payee public key 604 may be used to generate a payee address 614 via the use of one or more hashing algorithms 610. The payee address 614 may be a unique value associated with the payee 104 and may be used as a destination address for currency being transferred in a subsequent blockchain transaction. The hashing algorithms 610 may, in some embodiments, additionally and/or alternatively use encoding, such as Base58Check encoding, to generate a payee address 614 that is a string of alphanumeric characters that consists of only characters that are easily distinguished.

The encoded network value 612, payee address 614, and transaction value 606 may be combined (e.g., in a string of characters, in an array of values, or other suitable type of data storage) in a transaction message data element 616. The data element 616 may be, for example, a data element reserved for private use in the one or more standards on which transaction messages are based, such as the ISO 8583 standard. The invoice may be included in the data element 616, which may be included in a transaction message and used to initiate a blockchain transaction to be carried out by the blockchain network 106 associated with the network identifier 602, to pay the transaction value 606 to a payee 104 associated with the generated payee address 614.

Process for Linking Blockchain Transactions to Verified Identities

Figure 7:
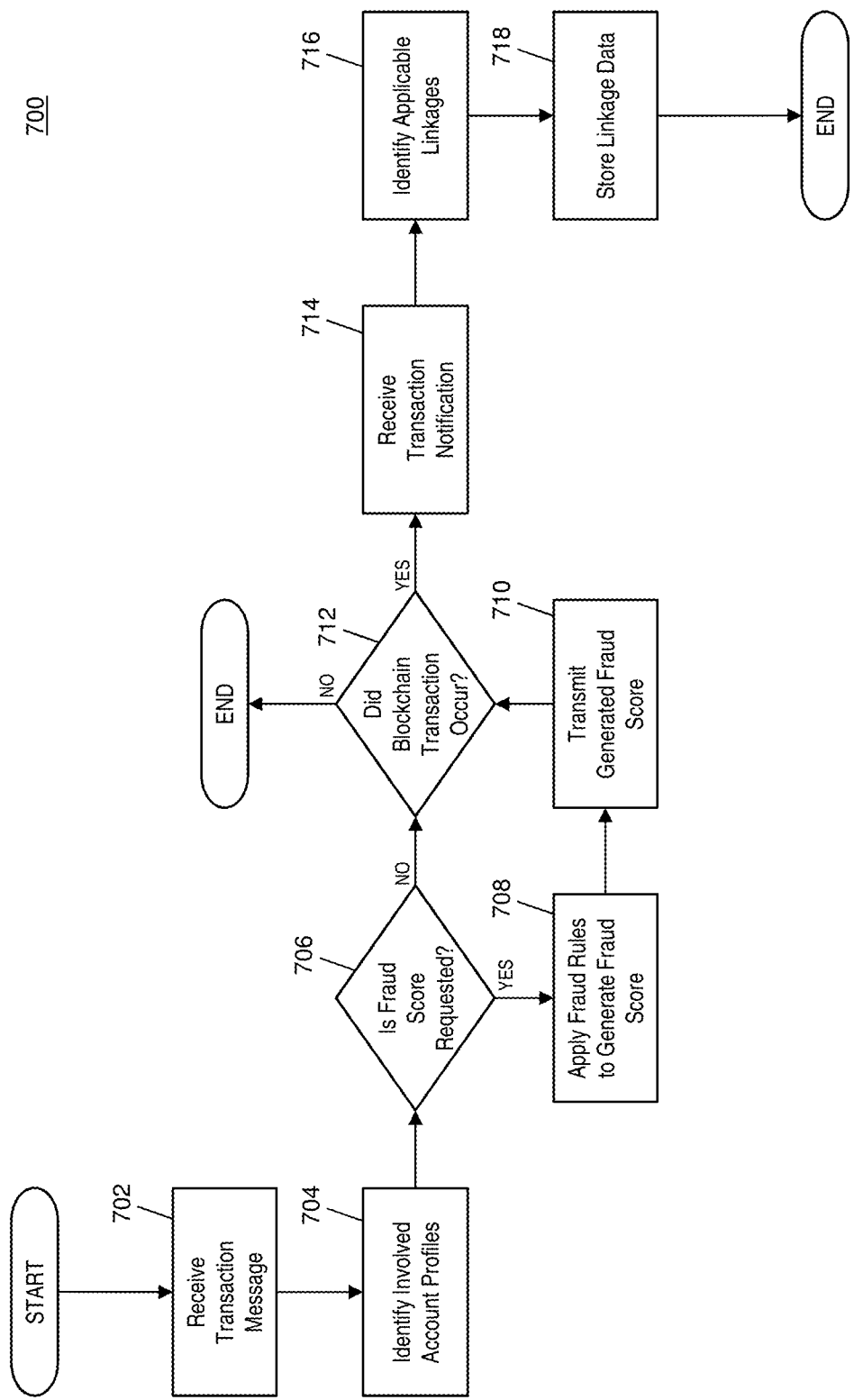
FIG. 7 is a flow diagram illustrating a process for linking blockchain transaction data to privately verified identities in accordance with exemplary embodiments.

FIG. 7 illustrates a process 700 for the linking of blockchain transactions to privately verified identities using the processing server 110 of the payment network 108. It will be apparent to persons having skill in the relevant art that the process 700 illustrated in FIG. 7 and discussed herein may be performed by any entity configured to receive and analyze transaction messages and receiving and verify blockchain transactions using privately and/or publicly available sources of blockchain transaction information (e.g., by analysis of the blockchain itself), such as the issuer 112. For example, the steps of the process 700 as performed by the components of the processing server 110, as discussed below, may be performed by corresponding components of the issuer 112 in performing the process 700 by the issuer 112.

In step 702, the receiving unit 202 of the processing server 110 may receive a transaction message. The transaction message may be formatted based on one or more standards, such as the ISO 8583 standard, and may include a plurality of data elements. The data elements may include at least a first data element configured to store a personal account number, a second data element configured to store a merchant identifier, and a third data element configured to store at least a blockchain network identifier associated with a blockchain network 106. In some embodiments, the data included in each of the data elements may be included in a single data element, such as a data element reserved for private use.

In step 704, the processing unit 204 of the processing server 110 may identify account profiles 210 stored in the account database 208 that correspond to entities involved in the associated payment transaction. For example, the processing server 110 may identify a first account profile associated with a payer 102 that includes an account identifier included in the first data element configured to store a personal account number, and may identify a second account profile associated with a payee 104 that includes an account identifier included in the second data element configured to store a merchant identifier. In some instances, the account identifiers may be address identifiers, such as generated using public keys of a key pair associated with the respective entity.

In step 706, the processing unit 204 may determine if a fraud score for the corresponding payment transaction is requested. For instance, a fraud score may be requested by an issuer 112 associated with the payer 102 or an acquirer 114 associated with the payee 104, such as in instances where the transaction message is received by the processing server 110 prior to processing of the corresponding blockchain transaction. If a fraud score is not requested, the process 700 may proceed to step 712. If a fraud score is requested, then, in step 708, the processing unit 204 may apply fraud rules (e.g., as stored in the memory 216) to data included in the received transaction message, and, in some instances, the identified account profiles, to generate a fraud score. In step 710, the transmitting unit 206 of the processing server 110 may transmit the fraud score to the appropriate entity, such as the issuer 112 and/or the acquirer 114.

In step 712, the processing unit 204 may determine if a blockchain transaction associated with the received transaction message occurred. The determination may either be: (1) based on the receipt of a transaction notification from the blockchain network 106 or from an entity configured to initiate the blockchain transaction (e.g., the issuer 112); (2) inherent to the processing server 110 in instances where the processing server 110 initiates the blockchain transaction; or (3) based on verification of the blockchain transaction by analysis of the blockchain itself (e.g., using the payee address, transaction amount, and other information included in the transaction message). If the blockchain transaction did not occur, then the process 700 may be completed, as no linkage may be necessary.

If the blockchain transaction did occur, then, in step 714, the receiving unit 202 of the processing server 110 may receive a transaction notification associated with the blockchain transaction. The transaction notification may be provided by, for example, the blockchain network 106, the issuer 112, the acquirer 114, the payer 102, the payee 104, or an entity configured to verify blockchain transactions using the blockchain, such as the payment network 108 (e.g., using the processing unit 204) or a third party. The transaction notification may include at least a transaction identifier and an address identifier. The transaction identifier may be a unique value associated with the blockchain transaction. The address identifier may include an address associated with the payee 104. In some instances, the transaction notification may also include a payer address associated with the payer 102, and any additional information, such as a transaction amount. In some cases, the processing unit 204 may identify such information from the received transaction message.

In step 716, the processing unit 204 may identify any applicable linkages based on the information included in the received transaction notification. For instance, the processing unit 204 may identify a linkage between the blockchain transaction and the second account profile identified in step 704 associated with the payee 104 of the transaction based on a correspondence with the included account and/or address identifier and the address identifier included in the received transaction notification. In instances where the transaction notification may include a payer address, the processing unit 204 may identify a linkage between the first account profile identified in step 704 and the blockchain transaction using the payer address.

In step 718, the processing unit 204 may storage linkage data in the processing server 110. For example, the linkage data may be stored as a linkage between each applicable account profile and the transaction identifier in the memory 216, may be stored in a transaction data entry 214 in the transaction database 212 associated with the blockchain transaction (e.g., as account identifiers for linked account profiles 210), or may be stored in account profiles 210 that are identified as linked to the transaction, such as by storage of the transaction identifier for the linked transaction in the account profile 210. In some instances, storage of linkage data may include transmitting, by the transmitting unit 206, linkage data to an external entity for storage, such as to the issuer 112 for storage in an account profile 314 for use in future blockchain transactions.

Process for Management of Fractional Reserves

Figure 8:
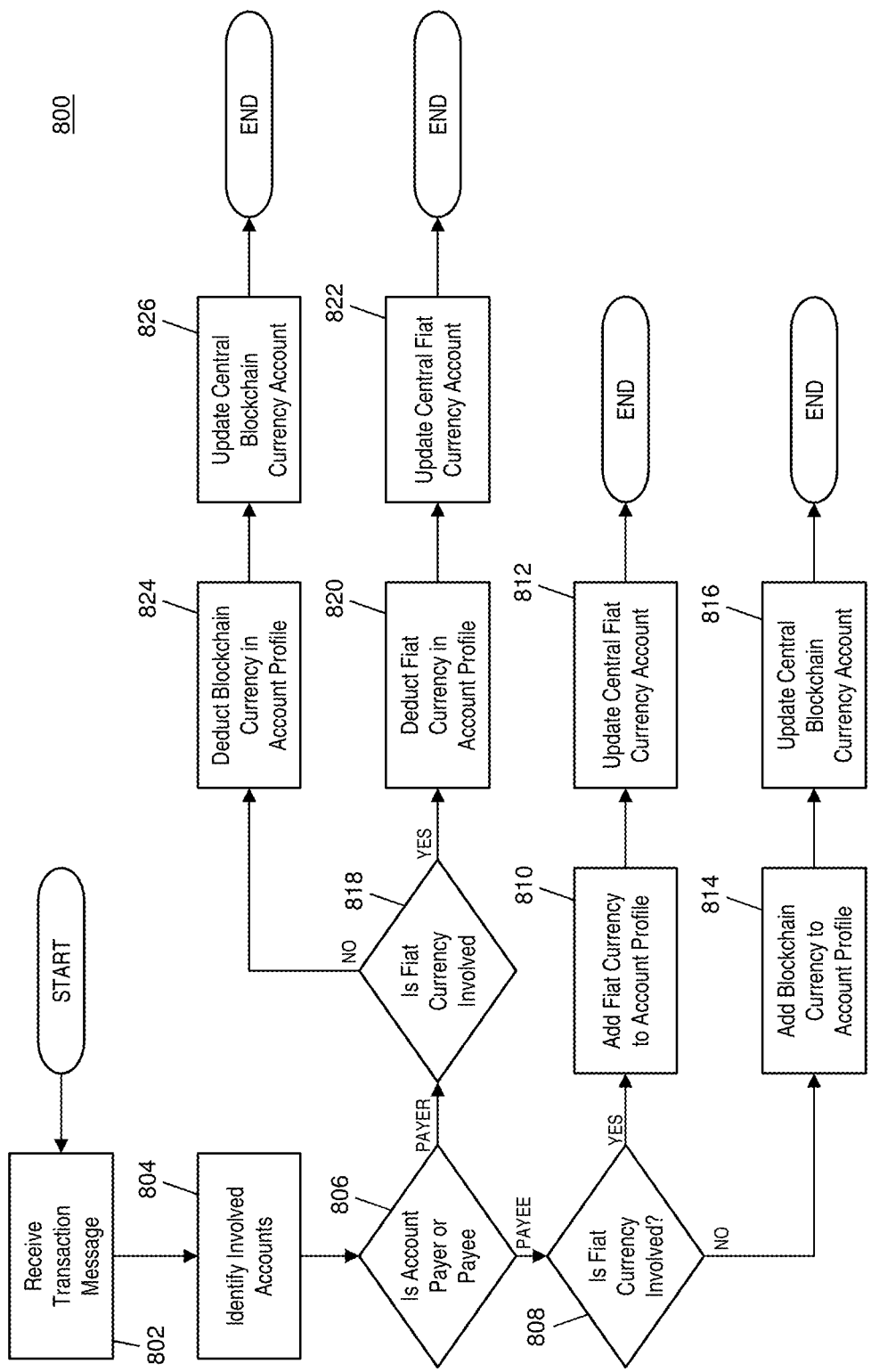
FIG. 8 is a flow diagram illustrating a process for the management of fractional reserves of fiat and blockchain currency in accordance with exemplary embodiments.

FIG. 8 illustrates a process 800 for the management of fractional reserves of fiat and blockchain currency in an issuer 112 or other financial institution configured to issue transaction accounts using a combination of fiat and one or more blockchain currencies.

In step 802, the receiving unit 302 of the issuer 112 may receive a transaction message. The transaction message may be associated with a payment transaction and may be formatted based on one or more standards, such as the ISO 8583, and received using associated communication protocols. The transaction message may include a plurality of data elements, including at least a data element reserved for private use that includes at least a specific address associated with an entity involved in the related transaction and a transaction amount. In some instances, the data element reserved for private use, or another data element in addition thereto, may include additional addresses.

In step 804, the processing unit 304 of the issuer 112 may identify account profiles 314 stored in the account database 312 involved in the related payment transaction. The account profiles 314 may be identified based on addresses included therein that correspond to addresses included in data elements included in the received transaction message. In instances where multiple involved account profiles 314 may be identified, the remaining steps of the process 800 may be performed for each of the identified account profiles 314.

In step 806, the processing unit 304 may identify if the identified account profile 314 corresponds to a payer 102 or payee 104 for the transaction. The determination may be based on the data element in which the associated address is stored, a location within the data element (e.g., in the invoice stored therein), a source of the transaction message, or other suitable value.

If the account profile 314 is associated with a payee 104 for the transaction, then, in step 808, the processing unit 304 may determine if fiat currency is involved in the transaction. The determination may be based on data elements included in the received transaction message. For example, if fiat currency is involved, each data element included in the transaction message may include data as specified based on the one or more standards, including a transaction amount having a non-zero value. In another example, if fiat currency is not involved, a data element configured to store a transaction amount may have a zero amount, a data element reserved for private use may include a blockchain transaction invoice, and/or an additional data element may include data indicating that the transaction is a blockchain or otherwise non-fiat transaction.

If the transaction involves the use of fiat currency, then, in step 810, the processing unit 304 may add fiat currency to a fiat currency amount in the corresponding account profile 314. The currency amount added may be based on an amount included in a data element configured to store a transaction amount in the received transaction message. In step 812, a fiat currency amount in a central account 310 associated with the fiat currency stored in the central database 308 may be updated (e.g., increased) by the same or a related (e.g., due to a fee) currency amount.

If the transaction does not involve the use of a fiat currency, then, in step 814, the processing unit 304 may add blockchain currency to a blockchain currency amount in the corresponding account profile 314. The currency amount added may be based on an amount included in a data element reserved for private use in the received transaction message, or as included in a transaction notification associated with the corresponding blockchain transaction, such as via analysis of the blockchain. In step 816, a blockchain currency amount in a central account 310 associated with the blockchain currency may be updated (e.g., increased) by the same or a related (e.g., due to a fee) currency amount.

If, in step 806, the processing unit 304 determines that the involved account profile 314 corresponds to a payer 102 for the transaction, then, in step 818, the processing unit 304 may determine if fiat currency is involved in the transaction. Similar to the determination made in step 808 for a payee 104, the determination may be based on data elements included in the received transaction message. If the transaction involves fiat currency, then, in step 820, fiat currency may be deducted from the account profile 314 based on a currency amount. In step 822, fiat currency may be deducted from the fiat currency central account 310 of the central database 308, based on a currency amount (e.g., with an additional fee removed). If the transaction involves blockchain currency, then the account profile 314 and a blockchain currency central account 310 may both be updated via deductions of blockchain currency based on a currency amount.

Process for Authorization of Blockchain-Based Transactions Based on Risk

Figure 9:
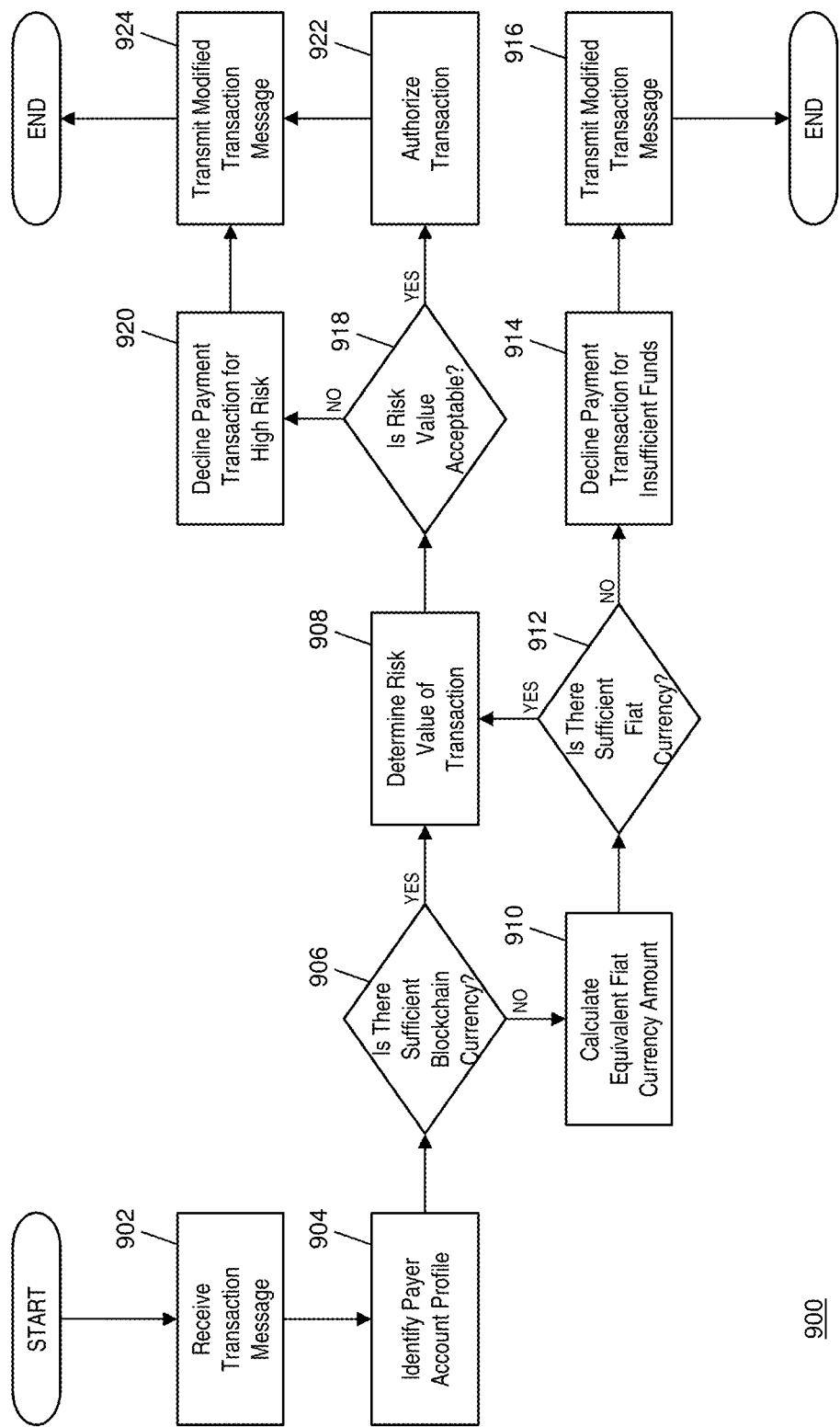
FIG. 9 is a flow diagram illustrating a process for authorization of a blockchain transaction based on an identified risk value in accordance with exemplary embodiments.

FIG. 9 illustrates a process 900 for the authorization of blockchain transactions based on risk using the processing server 110 of the payment network 108. It will be apparent to persons having skill in the relevant art that the process 900 illustrated in FIG. 9 and discussed herein may be performed by any entity configured to receive and analyze transaction messages and determine risk, such as the issuer 112. For example, the steps of the process 900 as performed by the components of the processing server 110, as discussed below, may be performed by corresponding components of the issuer 112 in performing the process 900 by the issuer 112.

In step 902, the receiving unit 202 of the processing server 110 may receive a transaction message. The transaction message may be formatted based on one or more standards, such as the ISO 8583 standard, and may include a plurality of data elements. The data elements may include a first data element configured to store a personal account number that includes a specific account identifier and a second data element reserved for private use that includes at least a blockchain network identifier and a transaction amount. In step 904, the processing unit 204 of the processing server 110 may identify an account profile 210 associated with a payer 102 involved in the payment transaction. The account profile 210 may be identified based on a correspondence between the included account identifier and the specific account identifier included in the data element configured to store a personal account number.

In step 906, the processing unit 204 may determine if the identified account profile 210 includes sufficient blockchain currency to fund the blockchain transaction. If the account includes sufficient currency, then, in step 908, a risk value for the transaction may be determined based on the sufficiency of currency. In some instances, the risk value may be based on a difference in the available currency (e.g., as indicated in the account profile 210) and the transaction amount. For example, there may be a higher risk indicated if the transaction is barely covered such that a concurrent transaction could result in the payer 102 being unable to afford the amount.

If, in step 906, the processing unit 204 determines that there is not sufficient blockchain currency in the account profile 210, then, in step 910, the processing unit 204 may calculate an equivalent amount of fiat currency. The calculation may use one or more conversion rates, such as may be stored in the memory 216, or retrieved via use of the transmitting unit 206 and receiving unit 202, such as by requesting a conversion rate from the blockchain network 106, a financial institution, or other third party. In step 912, the processing unit 204 may determine if the identified account profile 210 includes a sufficient amount of fiat currency to cover the equivalent amount for the transaction.

If the processing unit 204 determines that the account does not include a sufficient amount of blockchain or fiat currency, then, in step 914, the processing unit 204 may decline the payment transaction due to insufficient funds. The decline of the payment transaction may include modifying the transaction message to indicate that the transaction is declined, such as by modification of a message type indicator and/or one or more data elements. In step 916, the transmitting unit 206 may transmit the modified transaction message as an authorization response to the received transaction message.

If the processing unit 204 determines, in step 912, that there is sufficient fiat currency to cover the transaction amount, then the process 900 may proceed to step 908 where a risk value is determined. In some instances, the risk value may be affected by the availability of each specific type of currency. For instance, if the payer 102 has insufficient blockchain currency, but a sufficient equivalent amount of fiat currency, the risk value may indicate a higher risk than a sufficient amount of blockchain currency in the same proportion. Risk values based on availability of blockchain and fiat currency may be similar to risk values based on availability of multiple types of currency in traditional transactions where multiple fiat currencies may be involved.

In step 918, the processing unit 204 may determine if the risk value that is determined is an acceptable level. The acceptance of a risk value may be based on criteria set forth by the issuer 112 associated with the payer 102, by the payer 102, by the payment network 108, by a payee 104 involved in the transaction, by an acquirer 114 associated with the payee 104, or by a combination thereof. If the risk value is not acceptable, then, in step 920, the processing unit 204 may decline the payment transaction due to the high risk. The declining of the transaction may include modifying the transaction message to indicate that the transaction is declined, such as by modification of a message type indicator and/or one or more data elements. In some instances, the modification may include an indication of the reason for denial, such as, in this case, the high risk. In step 924, the transmitting unit 206 may transmit the modified transaction message as an authorization response to the received transaction message via the payment network 108.

If, in step 918, the processing unit 204 determines that the risk value is acceptable, then, in step 922, the transaction may be authorized. Authorization of the transaction may include modifying the transaction message to indicate approval of the transaction, such as by modification of a message type indicator and/or one or more data elements. In step 924, the modified transaction message may be transmitted via the payment network 108. In some instances, a transaction message for a denied transaction may be transmitted to the payer 102 and/or payee 104, while a transaction message for an approved transaction may be transmitted to the issuer 112 or other entity for further authorization.

Exemplary Method for Authorizing a Blockchain-Based Transaction

Figure 10:
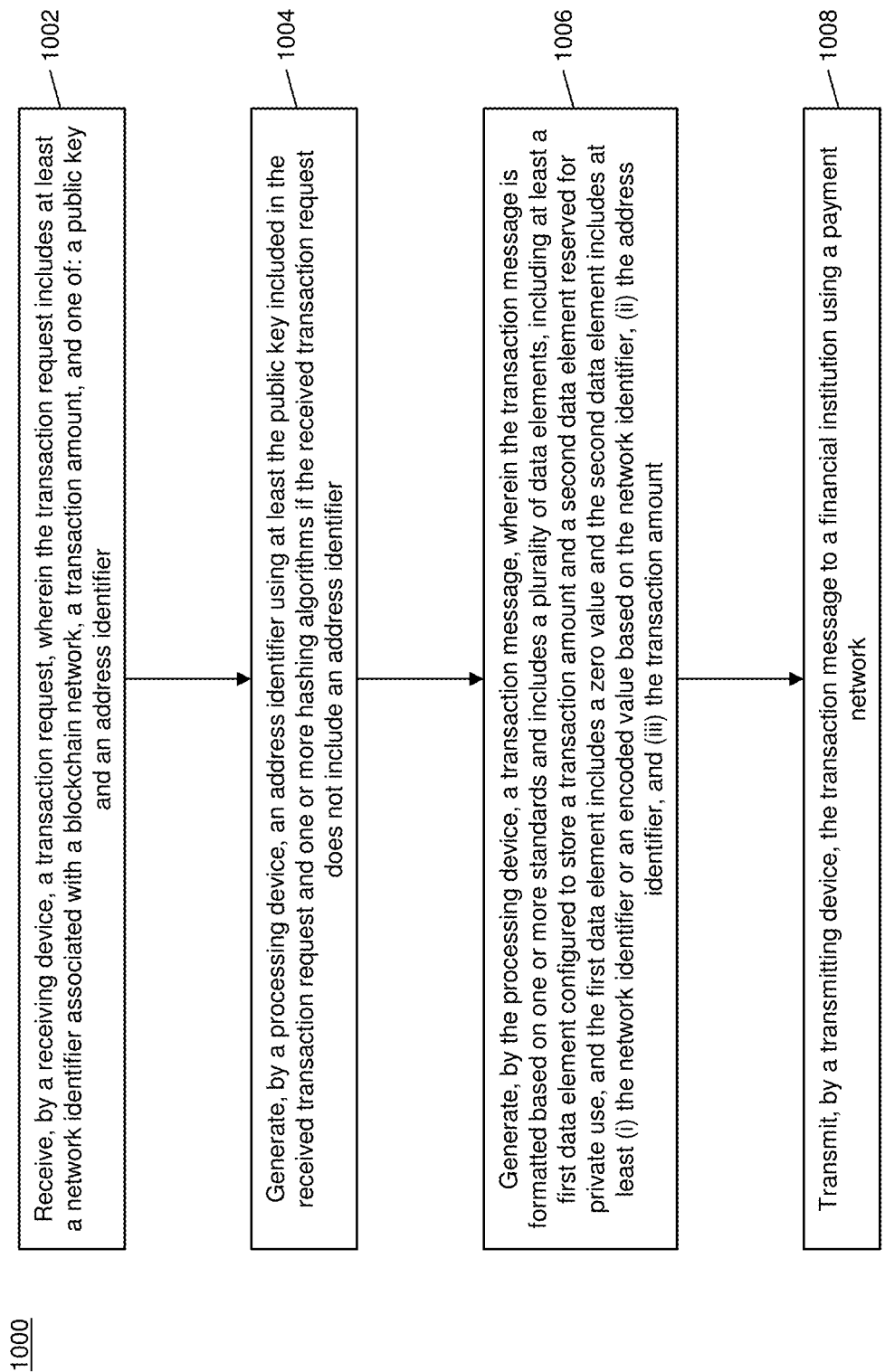
FIG. 10 is a flow chart illustrating an exemplary method for authorization of a blockchain-based transaction in accordance with exemplary embodiments.

FIG. 10 illustrates a method 1000 for authorizing a blockchain-based transaction using a transaction message generated by and transmitted via a payment network 108.

In step 1002, a transaction request may be received by a receiving device (e.g., the receiving unit 202), wherein the transaction request includes at least a network identifier associated with a blockchain network (e.g., the blockchain network 106), a transaction amount, and one of: a public key and an address identifier. In step 1004, an address identifier may be generated by a processing device (e.g., the processing unit 204) using at least the public key included in the received transaction request and one or more hashing and/or encoding algorithms if the received transaction request does not include an address identifier. In one embodiment, the one or more hashing and/or encoding algorithms includes the use of Base58Check encoding.

In step 1006, a transaction message may be generated by the processing device, wherein the transaction message is formatted based on one or more standards and includes a plurality of data elements, including at least a first data element configured to store a transaction amount and a second data element reserved for private use, and the first data element includes a zero value and the second data element includes at least (i) the network identifier or an encoded value based on the network identifier, (ii) the address identifier, and (iii) the transaction amount. In one embodiment, the one or more standards may include at least the ISO 8583 standard. In some embodiments, the transaction message may include a message type indicator indicative of an authorization message. In one embodiment, the encoded value based on the network identifier is a hexadecimal value generated using at least the network identifier and one or more algorithms. In some embodiments, the transaction message may include a third data element configured to store a processing code indicative of a non-currency transaction.

In step 1008, the transaction message may be transmitted by a transmitting device (e.g., the transmitting unit 206) to a financial institution (e.g., the issuer 112) using a payment network (e.g., the payment network 108). In one embodiment, the method 1000 may further include receiving, by the receiving device 202, a return transaction message from the financial institution 112 using the payment network 108, wherein the return transaction message includes a third data element configured to store a response code. In a further embodiment, the method 1000 may even further include transmitting, by the transmitting device 206, the return transaction message in response to the received transaction request. In another further embodiment, the response code may be indicative of approval of the transaction associated with the generated transaction message, and the second data element may further include a reference identifier. In an even further embodiment, the reference identifier may be at least one of: a value associated with a transaction conducted using the associated blockchain network 106 and a digital signature generated based on at least a portion of the data included in the second data element included in the generated transaction message.

Figure 11:
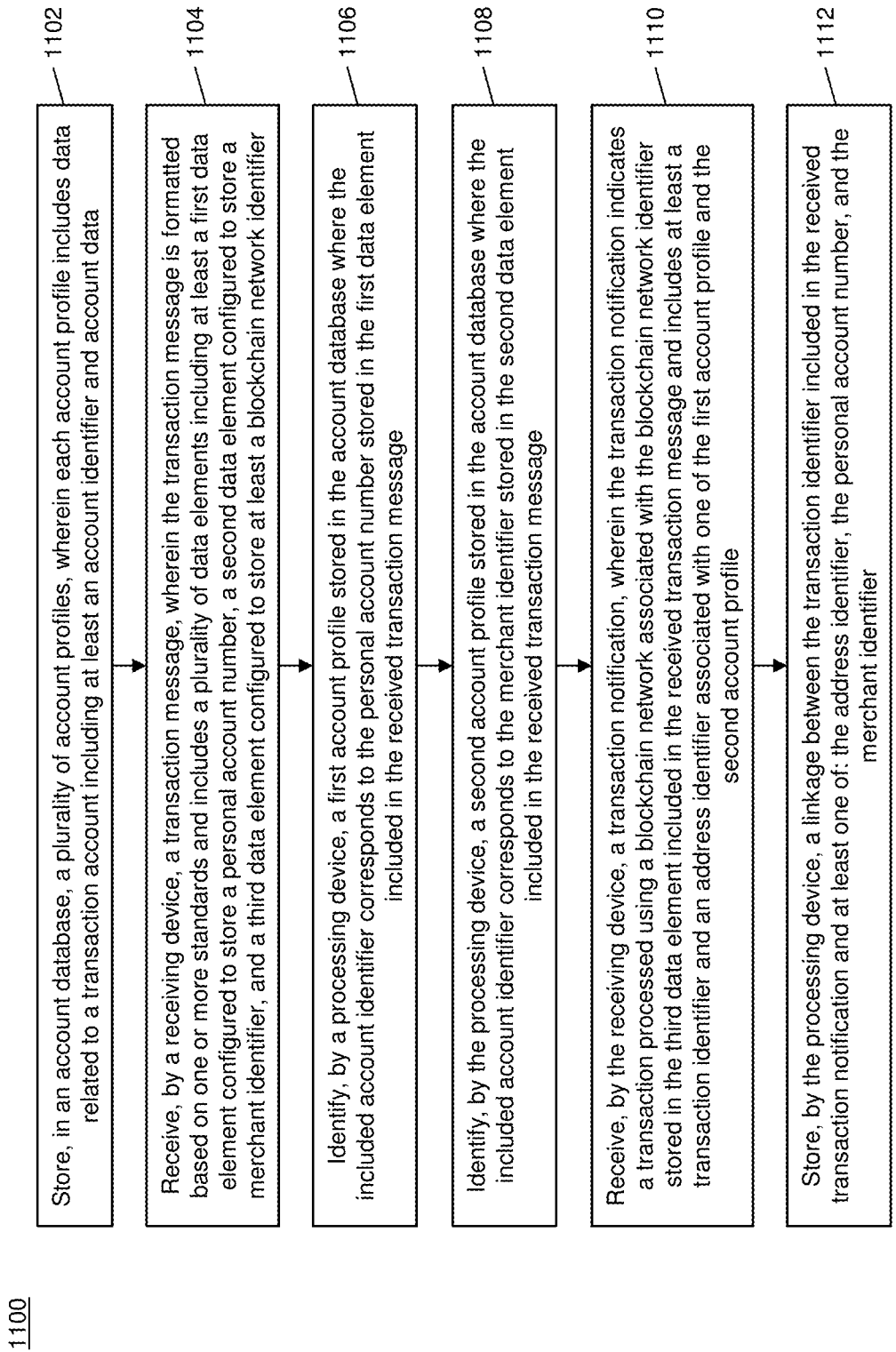
FIG. 11 is a flow chart illustrating an exemplary method for linking blockchain transactions to privately verified identifies in accordance with exemplary embodiments.

Exemplary Method for Linking Blockchain Transactions to Private Verified Identities FIG. 11 illustrates a method 1100 for the linking of blockchain transactions to privately verified identities based on the use of standardized transaction messages and data elements included therein.

In step 1102, a plurality of account profiles (e.g., account profiles 210) may be stored in an account database (e.g., the account database 208), wherein each account profile 210 includes data related to a transaction account including at least an account identifier and account data. In one embodiment, the account data may include at least one of: transaction data, location data, characteristic data, and fraud data.

In step 1104, a transaction message may be received by a receiving device (e.g., the receiving unit 202), wherein the transaction message is formatted based on one or more standards and includes a plurality of data elements including at least a first data element configured to store a personal account number, a second data element configured to store a merchant identifier, and a third data element configured to store a blockchain network identifier. In one embodiment, the transaction message may include a fourth data element configured to store a processing code indicative of a non-currency transaction. In some embodiments, the transaction message may include a message type indicator indicative of an authorization message.

In step 1106, a first account profile 210 stored in the account database 208 may be identified by a processing device (e.g., the processing unit 204) where the included account identifier corresponds to the personal account number stored in the first data element included in the received transaction message. In step 1108, a second account profile 210 stored in the account database 208 may be identified by the processing device 204 where the included account identifier corresponds to the merchant identifier stored in the second data element included in the received transaction message.

In step 1110, a transaction notification may be received by the receiving device 202, wherein the transaction notification indicates a transaction processed using a blockchain network (e.g., the blockchain network 106) associated with the blockchain network identifier stored in the third data element included in the received transaction message and includes at least a transaction identifier and an address identifier associated with one of the first account profile 210 and the second account profile 210. In one embodiment, the address identifier may be a hash generated using a public key associated with one of the first account profile 210 and the second account profile 210.

In step 1112, a linkage between the transaction identifier included in the received transaction notification and at least one of: the address identifier, the personal account number, and the merchant identifier may be stored by the processing device 204. In one embodiment, the linkage may be stored in a transaction database (e.g., the transaction database 212), as a linkage profile, the linkage profile including at least the transaction identifier and the at least one of: the address identifier, the personal account number, and the merchant identifier. In some embodiments, the linkage may be stored in the first account profile 210. In one embodiment, the linkage may be stored in the second account profile 210.

Exemplary Method for Managing Fractional Reserves of Blockchain Currency

Figure 12:
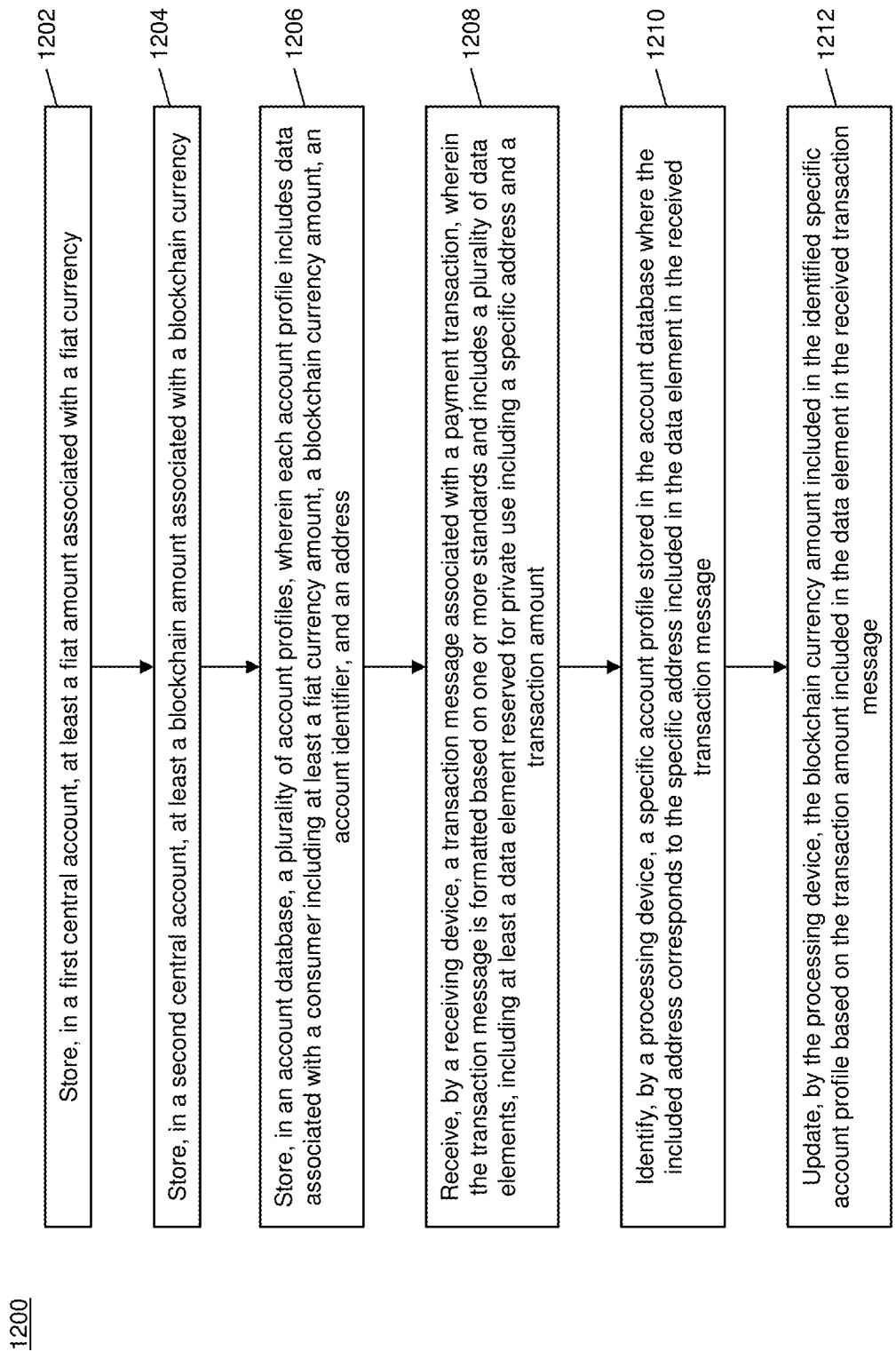
FIG. 12 is a flow chart illustrating an exemplary method for managing fractional reserves of blockchain currency in accordance with exemplary embodiments.

FIG. 12 illustrates a method 1200 for the management of fractional reserves of blockchain and fiat currency for use by a financial institution in a payment network.

In step 1202, at least a fiat amount associated with a fiat currency may be stored in a first central account (e.g., central account 310). In step 1204, at least a blockchain amount associated with a blockchain currency may be stored in a second central account 310. In step 1206, a plurality of account profiles (e.g., account profiles 314) may be stored in an account database (e.g., the account database 312), wherein each account profile 314 may include data associated with a consumer (e.g., the payer 102, payee 104, a transaction account, etc.) including at least a fiat currency amount, a blockchain currency amount, an account identifier, and an address. In one embodiment, the blockchain amount stored in the second central account 310 is based on a sum of the blockchain currency amounts included in each account profile 314 stored in the account database 312.

In step 1208, a transaction message associated with a payment transaction may be received by a receiving device (e.g., the receiving unit 302), wherein the transaction message is formatted based on one or more standards and includes a plurality of data elements, including at least a data element reserved for private use including a specific address and a transaction amount. In one embodiment, the one or more standards may include at least the ISO 8583 standard. In step 1210, a specific account profile 314 stored in the account database 312 may be identified by a processing device (e.g., the processing unit 304) where the included address corresponds to the specific address included in the data element in the received transaction message.

In step 1212, the blockchain currency amount included in the identified specific account profile 314 may be updated by the processing device 304 based on the transaction amount included in the data element in the received transaction message. In one embodiment, the method 1200 may further include updating, by the processing device 304, the blockchain amount stored in the second central account 310 based on the transaction amount included in the data element in the received transaction amount. In some embodiments, the method 1200 may also include initiating, by the processing device 304, a blockchain transaction using a blockchain network (e.g., the blockchain network 106) associated with the blockchain currency amount, wherein the blockchain transaction is for the transaction amount to or from the specific address.

In one embodiment, the second central account 310 is further configured to store a plurality of keys, each key associated with an account profile 314 stored in the account database 312. In a further embodiment, the method 1200 may further include generating, by the processing device 304, the address stored in each account profile 314 of the account database 312 based on application of the associated key to one or more hashing and/or encoding algorithms. In an even further embodiment, the one or more hashing and/or encoding algorithms may include the use of Base58Check encoding.

In one embodiment, the transaction message may further include a data element configured to store a personal account number that includes a funding address. In a further embodiment, the method 1200 may also include: identifying, by the processing device 304, a funding account profile 314 stored in the account database 312 where the included address corresponds to the funding address; and deducting, by the processing device 304, the blockchain currency amount included in the identified funding account profile 314 based on the transaction amount included in the data element in the received transaction message, wherein updating the blockchain currency amount included in the identified specific account profile 314 includes adding to the blockchain currency amount based on the transaction amount included in the data element in the received transaction message.

Exemplary Method for Authorizing a Blockchain Transaction Using Risk Values

Figure 13:
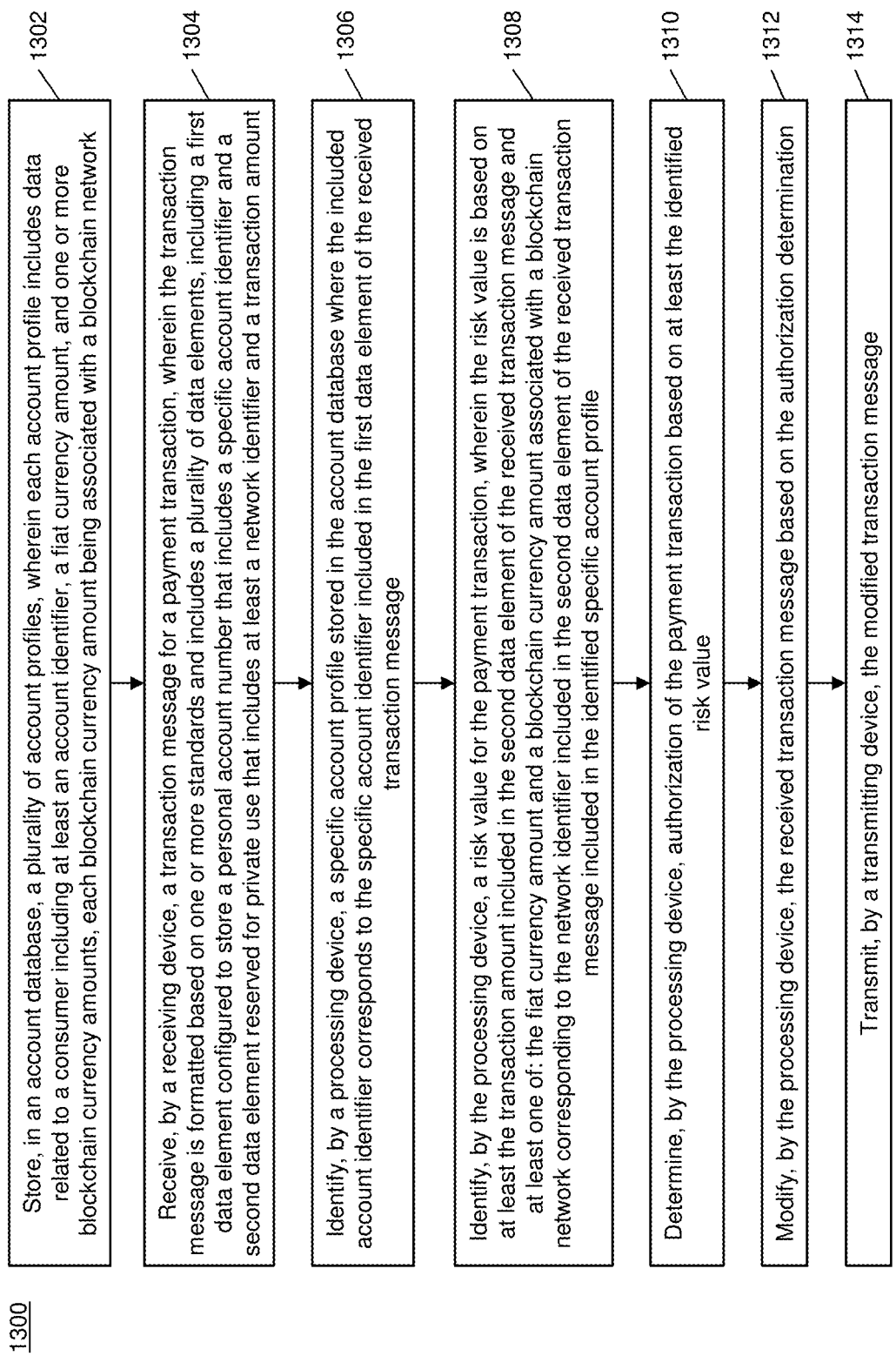
FIG. 13 is a flow chart illustrating an exemplary method for authorizing a blockchain transaction using risk values in accordance with exemplary embodiments.

FIG. 13 illustrates a method 1100 for the authorization of blockchain transactions in a payment network using risk values based on available blockchain and/or fiat currency.

In step 1302, a plurality of account profiles (e.g., account profiles 210) may be stored in an account database (e.g., the account database 208), wherein each account profile 210 includes data related to a consumer (e.g., the payer 102, payee 104, a transaction account, etc.) including at least an account identifier, a fiat currency amount, and one or more blockchain currency amounts, each blockchain currency amount being associated with a blockchain network (e.g., the blockchain network 106).

In step 1304, a transaction message for a payment transaction may be received by a receiving device (e.g., the receiving unit 202), wherein the transaction message is formatted based on one or more standards and includes a plurality of data elements, including a first data element configured to store a personal account number that includes a specific account identifier and a second data element reserved for private use that includes at least a network identifier and a transaction amount. In one embodiment, the one or more standards may include at least the ISO 8583 standard.

In step 1306, a specific account profile 210 stored in the account database 208 may be identified by a processing device (e.g., the processing unit 204) where the included account identifier corresponds to the specific account identifier included in the first data element of the received transaction message. In step 1308, a risk value may be identified by the processing device 204 for the payment transaction, wherein the risk value is based on at least the transaction amount included in the second data element of the received transaction message and at least one of: the fiat currency amount and a blockchain currency amount associated with a blockchain network 106 corresponding to the network identifier included in the second data element of the received transaction message included in the identified specific account profile 210.

In one embodiment, the transaction amount may be an amount of blockchain currency and identifying a risk value for the payment transaction may be based on the transaction amount included in the second data element of the received transaction message and the blockchain currency amount associated with a blockchain network 106 corresponding to the network identifier included in the second data element of the received transaction message included in the identified specific account profile. In some embodiments, the transaction amount may be an amount of blockchain currency and identifying a risk value for the payment transaction may be based on the transaction amount included in the second data element of the received transaction message, the fiat currency amount included in the identified specific account profile, and an exchange rate for exchange of blockchain currency to and/or from fiat currency.

In step 1310, authorization of the payment transaction may be determined by the processing device 204 based on at least the identified risk value. In step 1312, the received transaction message may be modified by the processing device 204 based on the authorization determination. In one embodiment, modifying the received transaction message may include storing, in a third data element of the transaction message, a response code indicative of the authorization determination. In step 1314, a transmitting device (e.g., the transmitting unit 206) may transmit the modified transaction message.

In one embodiment, the method 1300 may further include: generating, by the processing device 204, an address identifier for each account profile 210 using at least the account identifier included in the respective account profile 210 and one or more hashing and/or encoding algorithms. In a further embodiment, the specific account identifier may have a value equivalent to the address identifier generated using the account identifier included in the identified specific account profile 210. In another further embodiment, the one or more hashing and/or encoding algorithms may include the use of Base58Check encoding.

In some embodiments, the method 1300 may also include initiating, by the processing device 204, a blockchain transaction using the blockchain network 106 corresponding to the network identifier included in the second data element of the received transaction message for the transaction amount from the specific account identifier. In a further embodiment, modifying the received transaction message may further include adding, to the second data element, a reference identifier generated as a result of initiating the blockchain transaction.

Computer System Architecture

Figure 14:
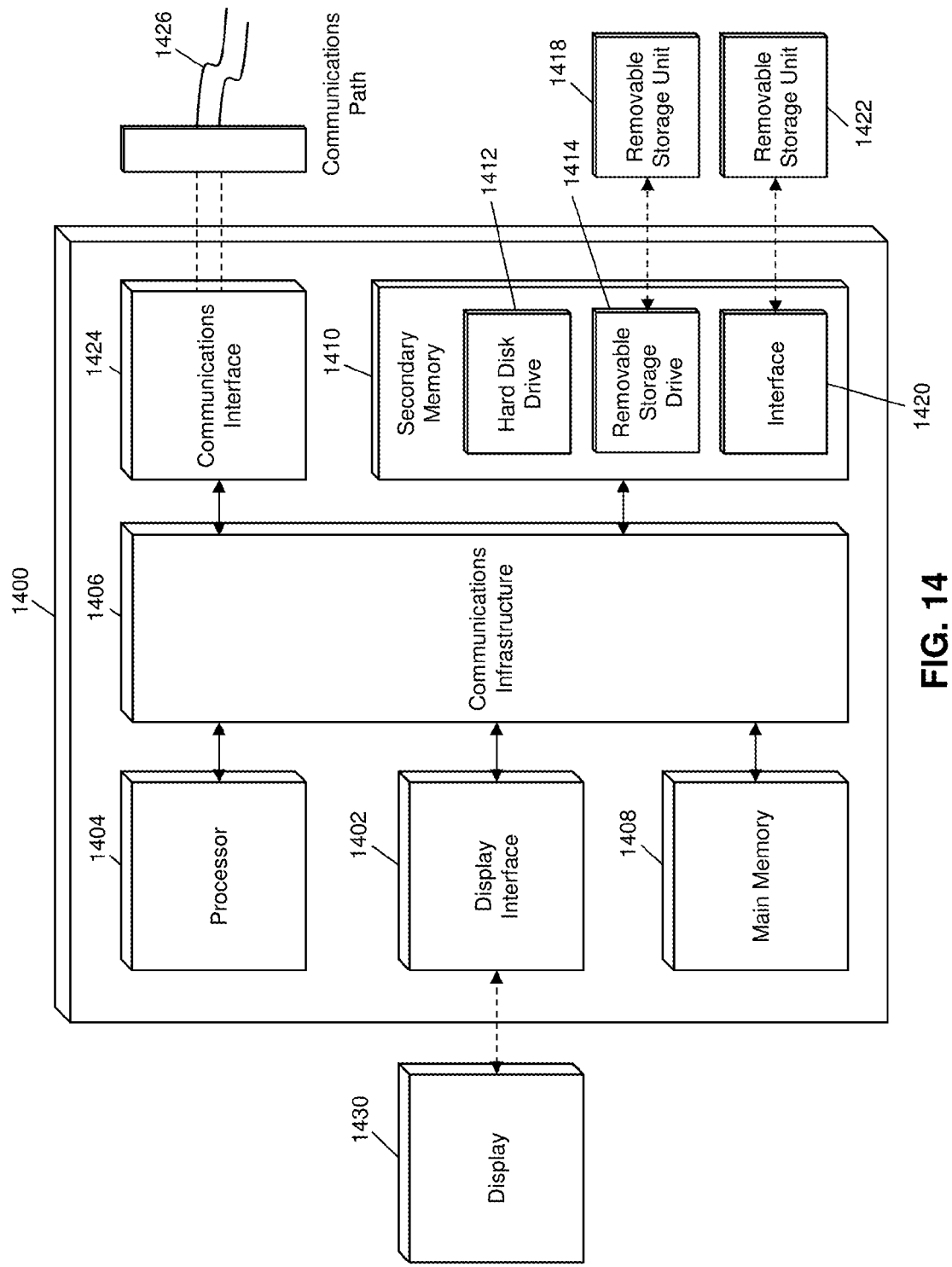
FIG. 14 is a block diagram illustrating a computer system architecture in accordance with exemplary embodiments.

FIG. 14 illustrates a computer system 1400 in which embodiments of the present disclosure, or portions thereof, may be implemented as computer-readable code. For example, the processing server 110 and issuer 112 of FIG. 1 may be implemented in the computer system 1400 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4, 5, and 7-13.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1418, a removable storage unit 1422, and a hard disk installed in hard disk drive 1412.

Various embodiments of the present disclosure are described in terms of this example computer system 1400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1404 may be a special purpose or a general purpose processor device. The processor device 1404 may be connected to a communications infrastructure 1406, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1400 may also include a main memory 1408 (e.g., random access memory, read-only memory, etc.), and may also include a secondary memory 1410. The secondary memory 1410 may include the hard disk drive 1412 and a removable storage drive 1414, such as a floppy disk drive, a magnetic tape drive, an optical disk drive, a flash memory, etc.

The removable storage drive 1414 may read from and/or write to the removable storage unit 1418 in a well-known manner. The removable storage unit 1418 may include a removable storage media that may be read by and written to by the removable storage drive 1414. For example, if the removable storage drive 1414 is a floppy disk drive or universal serial bus port, the removable storage unit 1418 may be a floppy disk or portable flash drive, respectively. In one embodiment, the removable storage unit 1418 may be non-transitory computer readable recording media.

In some embodiments, the secondary memory 1410 may include alternative means for allowing computer programs or other instructions to be loaded into the computer system 1400, for example, the removable storage unit 1422 and an interface 1420. Examples of such means may include a program cartridge and cartridge interface (e.g., as found in video game systems), a removable memory chip (e.g., EEPROM, PROM, etc.) and associated socket, and other removable storage units 1422 and interfaces 1420 as will be apparent to persons having skill in the relevant art.

Data stored in the computer system 1400 (e.g., in the main memory 1408 and/or the secondary memory 1410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, a distributed key-value store, etc. Suitable configurations and storage types will be apparent to persons having skill in the relevant art.

The computer system 1400 may also include a communications interface 1424. The communications interface 1424 may be configured to allow software and data to be transferred between the computer system 1400 and external devices. Exemplary communications interfaces 1424 may include a modem, a network interface (e.g., an Ethernet card), a communications port, a PCMCIA slot and card, etc. Software and data transferred via the communications interface 1424 may be in the form of signals, which may be electronic, electromagnetic, optical, or other signals as will be apparent to persons having skill in the relevant art. The signals may travel via a communications path 1426, which may be configured to carry the signals and may be implemented using wire, cable, fiber optics, a phone line, a cellular phone link, a radio frequency link, etc.

The computer system 1400 may further include a display interface 1402. The display interface 1402 may be configured to allow data to be transferred between the computer system 1400 and external display 1430. Exemplary display interfaces 1402 may include high-definition multimedia interface (HDMI), digital visual interface (DVI), video graphics array (VGA), etc. The display 1430 may be any suitable type of display for displaying data transmitted via the display interface 1402 of the computer system 1400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1408 and secondary memory 1410, which may be memory semiconductors (e.g., DRAMs, etc.). These computer program products may be means for providing software to the computer system 1400. Computer programs (e.g., computer control logic) may be stored in the main memory 1408 and/or the secondary memory 1410. Computer programs may also be received via the communications interface 1424. Such computer programs, when executed, may enable computer system 1400 to implement the present methods as discussed herein. In particular, the computer programs, when executed, may enable processor device 1404 to implement the methods illustrated by FIGS. 4, 5, and 7-13, as discussed herein. Accordingly, such computer programs may represent controllers of the computer system 1400. Where the present disclosure is implemented using software, the software may be stored in a computer program product and loaded into the computer system 1400 using the removable storage drive 1414, interface 1420, and hard disk drive 1412, or communications interface 1424.

Techniques consistent with the present disclosure provide, among other features, systems and methods for authorizing blockchain transactions, identifying risk values in blockchain transactions, and linking blockchain transactions with verified identities. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for authorization of a blockchain transaction, comprising:
   storing, in an account database of a processing server, a plurality of account profiles, wherein each account profile includes data related to a consumer including at least an account identifier, a fiat currency amount, and one or more blockchain currency amounts, each blockchain currency amount being associated with a blockchain network;
   receiving, by a receiving device of the processing server, via a payment network, a transaction message for a payment transaction, wherein the transaction message is formatted based on one or more standards and includes a plurality of data elements, including a first data element configured to store a personal account number that includes a specific account identifier and a second data element reserved for private use that includes at least a network identifier corresponding to a blockchain network and a transaction amount;
   identifying, by a processing device of the processing server, a specific account profile stored in the account database where the included account identifier corresponds to the specific account identifier included in the first data element of the received transaction message;
   identifying, by the processing device of the processing server, a risk value for the payment transaction, wherein the risk value is based on at least the transaction amount included in the second data element of the received transaction message and a combination of: the fiat currency amount and a blockchain currency amount associated with the blockchain network corresponding to the network identifier included in the second data element of the received transaction message included in the identified specific account profile;
   determining, by the processing device of the processing server, authorization of the payment transaction based on at least the identified risk value;
   modifying, by the processing device of the processing server, the received transaction message based on the authorization determination; and
   transmitting, by a transmitting device, the modified transaction message.

2. The method of claim 1, wherein the transaction amount is an amount of blockchain currency and identifying a risk value for the payment transaction is based on the transaction amount included in the second data element of the received transaction message and the blockchain currency amount associated with the blockchain network corresponding to the network identifier included in the second data element of the received transaction message included in the identified specific account profile.

3. The method of claim 1, wherein the transaction amount is an amount of blockchain currency and identifying a risk value for the payment transaction is based on the transaction amount included in the second data element of the received transaction message, the fiat currency amount included in the identified specific account profile, and an exchange rate for exchange of blockchain currency to and/or from fiat currency.

4. The method of claim 1, wherein modifying the received transaction message includes storing, in a third data element of the transaction message, a response code indicative of the authorization determination.

5. The method of claim 1, wherein the one or more standards includes at least the ISO 8583 standard.

6. The method of claim 1, further comprising:
   generating, by the processing device, an address identifier for each account profile using at least the account identifier included in the respective account profile and one or more hashing and/or encoding algorithms.

7. The method of claim 6, wherein the specific account identifier has a value equivalent to the address identifier generated using the account identifier included in the identified specific account profile.

8. The method of claim 6, wherein the one or more hashing and/or encoding algorithms includes the use of Base58Check encoding.

9. The method of claim 1, further comprising:
   initiating, by the processing device, a blockchain transaction using the blockchain network corresponding to the network identifier included in the second data element of the received transaction message for the transaction amount from the specific account identifier.

10. The method of claim 9, wherein modifying the received transaction message further includes adding, to the second data element, a reference identifier generated as a result of initiating the blockchain transaction.

11. A system for authorization of a blockchain transaction, comprising:
    an account database of a processing server configured to store a plurality of account profiles, wherein each account profile includes data related to a consumer including at least an account identifier, a fiat currency amount, and one or more blockchain currency amounts, each blockchain currency amount being associated with a blockchain network;
    a receiving device of the processing server configured to receive, via a payment network, a transaction message for a payment transaction, wherein the transaction message is formatted based on one or more standards and includes a plurality of data elements, including a first data element configured to store a personal account number that includes a specific account identifier and a second data element reserved for private use that includes at least a network identifier corresponding to a blockchain network and a transaction amount;
    a processing device of the processing server configured to
        identify a specific account profile stored in the account database where the included account identifier corresponds to the specific account identifier included in the first data element of the received transaction message,
        identify a risk value for the payment transaction, wherein the risk value is based on at least the transaction amount included in the second data element of the received transaction message and a combination of: the fiat currency amount and the blockchain currency amount associated with a blockchain network corresponding to the network identifier included in the second data element of the received transaction message included in the identified specific account profile, determine authorization of the payment transaction based on at least the identified risk value, and modify the received transaction message based on the authorization determination; and a transmitting device configured to transmit the modified transaction message.

12. The system of claim 11, wherein the transaction amount is an amount of blockchain currency and identifying a risk value for the payment transaction is based on the transaction amount included in the second data element of the received transaction message and the blockchain currency amount associated with the blockchain network corresponding to the network identifier included in the second data element of the received transaction message included in the identified specific account profile.

13. The system of claim 11, wherein the transaction amount is an amount of blockchain currency and identifying a risk value for the payment transaction is based on the transaction amount included in the second data element of the received transaction message, the fiat currency amount included in the identified specific account profile, and an exchange rate for exchange of blockchain currency to and/or from fiat currency.

14. The system of claim 11, wherein modifying the received transaction message includes storing, in a third data element of the transaction message, a response code indicative of the authorization determination.

15. The system of claim 11, wherein the one or more standards includes at least the ISO 8583 standard.

16. The system of claim 11, wherein the processing device is further configured to generate an address identifier for each account profile using at least the account identifier included in the respective account profile and one or more hashing and/or encoding algorithms.

17. The system of claim 16, wherein the specific account identifier has a value equivalent to the address identifier generated using the account identifier included in the identified specific account profile.

18. The system of claim 16, wherein the one or more hashing and/or encoding algorithms includes the use of Base58Check encoding.

19. The system of claim 11, wherein the processing device is further configured to initiate a blockchain transaction using the blockchain network corresponding to the network identifier included in the second data element of the received transaction message for the transaction amount from the specific account identifier.

20. The system of claim 19, wherein modifying the received transaction message further includes adding, to the second data element, a reference identifier generated as a result of initiating the blockchain transaction.

* * * * *